US012552557B2

(12) United States Patent
Pizziconi et al.

(10) Patent No.: US 12,552,557 B2
(45) Date of Patent: Feb. 17, 2026

(54) UNIVERSAL GROUND-BASED MICROGRAVITY SYSTEM

(71) Applicant: Arizona Board of Regents on behalf of Arizona State University, Scottsdale, AZ (US)

(72) Inventors: Vincent Pizziconi, Tempe, AZ (US); Kimia Seyedmadani, Paradise Valley, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 1027 days.

(21) Appl. No.: 17/639,241

(22) PCT Filed: Aug. 28, 2020

(86) PCT No.: PCT/US2020/048444
§ 371 (c)(1),
(2) Date: Feb. 28, 2022

(87) PCT Pub. No.: WO2021/071604
PCT Pub. Date: Apr. 15, 2021

(65) Prior Publication Data
US 2022/0332445 A1    Oct. 20, 2022

Related U.S. Application Data

(60) Provisional application No. 62/894,667, filed on Aug. 30, 2019.

(51) Int. Cl.
*B64G 7/00* (2006.01)

(52) U.S. Cl.
CPC ........................... *B64G 7/00* (2013.01)

(58) Field of Classification Search
CPC ...... B64G 7/00; B64G 2007/005; G09B 9/28; G09B 9/00
(Continued)

(56) References Cited

U.S. PATENT DOCUMENTS 4,102,187 A * 7/1978 Williams .................. G01F 1/22
                                                                  116/276
4,559,834 A * 12/1985 Phillips ..................... G01F 1/22
                                                                  73/861.55
(Continued)

FOREIGN PATENT DOCUMENTS

CN           1580763         2/2005
CN         103085992         5/2013
(Continued)

OTHER PUBLICATIONS

A Cogoli. The effect of hypogravity and hypergravity on cells of the immune system. Journal of Leukocyte Biology vol. 54, 1993, 10 pages.
(Continued)

*Primary Examiner* — Robert R Raevis
(74) *Attorney, Agent, or Firm* — Riverside Law LLP

(57) ABSTRACT

The present invention provides ground-based reduced gravity systems and methods of using the same to evaluate, synthesize, adapt, alter, process and produce diverse material systems, biological and non-biological, living and non-living, at close to true microgravity conditions as that which exist in space, and other reduced gravity conditions.

14 Claims, 19 Drawing Sheets

(58) Field of Classification Search
USPC .............................. 73/865.6, 861.55–861.58
See application file for complete search history.

(56) References Cited

U.S. PATENT DOCUMENTS

| | | | | |
|---|---|---|---|---|
| 4,678,438 | A | * | 7/1987 | Vykukal .................. G09B 9/00 434/34 |
| 5,717,137 | A | * | 2/1998 | Singleterry ............ B01D 35/02 73/239 |
| 5,718,587 | A | | 2/1998 | Sussingham |
| 5,887,827 | A | | 3/1999 | Sanders |
| 6,641,485 | B1 | | 11/2003 | Chauhan |
| 2011/0088586 | A1 | | 4/2011 | Huang |
| 2017/0234764 | A1 | | 8/2017 | Westman |

FOREIGN PATENT DOCUMENTS

| | | |
|---|---|---|
| CN | 103085992 A | 5/2013 |
| CN | 106448408 A | 2/2017 |
| CN | 106477074 | 3/2017 |
| CN | 109626152 A | 4/2019 |
| EP | 0350094 A1 | 1/1990 |
| JP | H0163500 A | 4/1989 |
| JP | H01158239 A | 6/1989 |
| JP | H01165799 U | 11/1989 |
| JP | H0596150 A | 4/1993 |
| JP | H06317531 A | 11/1994 |
| JP | H09132200 | 5/1997 |
| JP | H09132200 A | 5/1997 |
| JP | 2001099759 A | 4/2001 |
| JP | 2004168262 | 6/2004 |
| JP | 2004168262 A | 6/2004 |
| JP | 2018144470 A | 9/2018 |
| WO | 2021071604 | 4/2021 |

OTHER PUBLICATIONS

A Frontal and et al. Lunar Astrobiology: A Review and Suggested Laboratory Equipment. Astrobiology Special Review Journal vol. 7 Issue 5: 767-782, 2007.
Arvind Sinha and et.al. Mimicking biomineralization under microgravity. Elsevier, 2008, 6 pages.
B Lorber and et. al. Nucleation and growth of thaumatin crystals within a gel under microgravity on STS-95 mission vs. under Earth's gravity. Journal of Crystal Growth vol. 231: 252-261, 2001.
B Lorber. Growth kinetics and motion of thaumatin crystals during USML-2 and LMS microgravity missions and comparison with earth controls. Journal od Crystal Growth vol. 208: 665-677, 2000.
B.P Michael and et al. Zinc Crystal Growth in Microgravity. The Astrophysiology vol. 590: 579-585, 2003.
C Nickerson and et.al. Microbial Responses to Microgravity and Other Low-Shear Environments. Microbiology and Molecular Biology Journal: 345-361,2004.
D. Miller et. al. Spheres: A Testbed for Long Duration Satellite Formation Flying in Micro-Gravity Conditions. American aeronautical association, 2000, 13 pages.
E.H Burger. Microgravity and Bone Cell Mechanosensitivity. Bone vol. 22: 127-130, 1998.
E.H Snell and et. al. Macromolecular crystallization in microgravity. Institute of Physics vol. 68: 799-853, 2005.

EPO Communication issued in App. No. EP20875581, dated Nov. 8, 2023, 12 pages.
EPO Communication pursuant to Rule 164(1) issued in App. No. EP20875581, dated Aug. 7, 2023, 16 pages.
G Carmeliet and et.al. The effect of microgravity on morphology and gene expression of osteoblasts in vitro. The FASEB vol. 13, 1999, 6 pages.
G. Carmeliet and et.al. Microgravity Reduces the Differentiation of Human Osteoblastic MG-63 Cells. Journal of Bone and Mineral Research vol. 12, issue 5, 1997, 9 pages.
J Derby et. al. Developing Quantitative, Multiscale Models for Microgravity Crystal Growth. Academy of Science: 124-145, 2006.
J. Pennline . Simulating bone loss in microgravity using mathematical formulation of bone remodeling . NASA Glenn research. Cleveland Ohio, 2009, 28 pages.
KW Benz and et al. Semiconductor Crystal Growth Under Microgravity Results of Float-Zone Technique. Advance Space Research vol. 24: 1189-1194, 1999.
Liu , and K Tsukamoto. The effect of microgravity on nucleation kinetics, microgravity application. vol. 19. Issue 1, 2002, 5 pages.
M.A Bucaro. Bone Cell Survival in Microgravity. New York Academy of Science vol. 1027: 64-73, 2004.
M.H Fulford and et .al. Effects of Microgravity on Osteoblast Growth Activation. Cell Research vol. 224: 103-109, 1996.
M.H. Fulford. Physiological Effects of Microgravity on Osteoblast Morphology and Cell Biology. Advances in Space Biology and Medicine, 2001, 7 pages.
M.K Minor and et .al. An Automated Tether Management System for Microgravity Extravehicular Activities. Applied Science, 2002, 7 pages.
N. Talbot and et.al. The effects of space flight and microgravity on the growth and differentiation of PICM-19 pig liver stem cells. The Society for In Vitro Biology, 2010, 14 pages.
P N Colleran. Alterations in skeletal perfusion with simulated microgravity: a possible mechanism for bone remodeling. Journal of Applied Physics vol. 89: 1046-1054, 2000.
P. Fontana and et al. Characterization of sodium chloride crystals grown in microgravity. Journal of Crystal Growth vol. 324: 207-211, 2011.
Pletser, V. "Microgravity research during aircraft parabolic flights: the 20 ESA campaigns." ESA bulletin. Bulletin ASE. European Space Agency 82 (1995): 9-p.
Qing Qiu and et.al. 3-D Bone Tissue Engineering With Bioactive Microspheres in Simulated Microgravity. In vitro Biology vol. 37: 157-165, 2001.
R.K Anderson. Effects of Simulated Microgravity and Shear on Cell Behavior. University of Florida, 2004, 117 pages.
Report. Synergistic role of hydroxyapatite nanoparticles and pulsed electromagnetic field therapy to prevent bone loss in rats following exposure to simulated microgravity. International Journal of Nanomedicine, 2000, 13 pages.
Seyedmadani, K, Feasibility of Investigating Mineralization Processes Under Simulated Microgravity Free Convectionless Conditions in Unit Gravity Environment With Implication on Bone Mineral Density, ASU, 2013, 167 pages.
T Okubo and et.al. Kinetic analyses of colloidal crystallization in microgravity aircraft experiments. Physiochemical and Engineering Aspects Journal vol. 153: 515-524, 1999.
X.Y Liu. New Kinetic of CaCo3 nucleation and Microgravity. Langmuir vol. 16: 5499-5502, 2000.

* cited by examiner

UNIVERSAL GROUND-BASED MICROGRAVITY SYSTEM

CROSS REFERENCE TO RELATED APPLICATIONS

This application is a U.S. national phase application filed under 35 U.S.C. § 371 claiming benefit to International Patent Application No. PCT/US2020/048444, filed Aug. 28, 2020, which claims priority to U.S. Provisional Application No. 62/894,667, filed Aug. 30, 2019, both of which are hereby incorporated by reference herein in their entirety.

FIELD OF THE INVENTION

This invention relates to a method and apparatus that creates or otherwise induces variable and reduced gravity conditions in the presence of nonzero, finite gravitational forces in the ambient environment within a bounded region or volume in contact with a non-rotating, fluid medium and containing a material system affected by or responsive to forces of gravity.

BACKGROUND OF THE INVENTION

There is a growing interest and need to develop systems that are able to create reduced gravitational conditions (<1 g) and, in particular, ground-based systems. Interests in developing such systems stem from a global pursuit of human exploration of space, the need for specialized research and development ground-based systems to gain a deeper understanding of non-biological materials as well as biological materials and systems, non-living and living, in reduced gravity environments, the need for advanced manufacturing systems that produce high performance materials, devices and systems for Earth-based applications and extreme space environments in reduced gravity environments, and the need for less expensive and more accessible, practical ground-based systems that are scalable and generally applicable for the evaluation, synthesis, processing, or production of diverse material systems in reduced gravity environments, among others.

To date, there exists only a limited number of engineered methods and apparatuses that are capable of creating conditions that are able to reduce the effect of gravity on non-biological material systems, such as polymers, ceramics, metals and their composites, as well as non-living and living biological material systems and hybrid materials systems composed of both non-biological and biological materials, while in environments under the influence of gravitational fields. These include methods and apparatuses developed to operate in above ground Earth environments and those developed to operate on the ground, i.e., on a planetary surface or the Earth's surface, where unit gravitational (1-g or 9.81 m$^2$/s) forces are present. Examples of above ground reduced gravity systems include drop towers and tubes, balloons, aircraft that undergo parabolic flight patterns, sounding rockets, satellites, and low orbit space stations, such as the International Space Station (ISS), among others. Examples of ground-based reduced gravity systems include levitation systems (acoustic, magnetic, electromagnetic, electrostatic, dropping tube), pulsed EMAG systems, combination electromagnetic (EMAG)/buoyancy systems, random positioning systems, centrifugation systems, suspension systems (animals), head up/tilt down systems, water immersion systems, and fluid rotational systems, among others.

Existing reduced gravity systems include: a cable system that supports a test article in a gravity environment to test a test article in a simulated weightless condition; a manufacturing apparatus which is operated by a person in a microgravity environment; an apparatus and method comprising a hollow launch tube that launches a passenger vehicle by pressurized gas that provides passengers with a g-force or weightless experience; an apparatus and method that generates a magnetic field to levitate a heated and melted substance and subsequently cools to control the material shape more precisely; a low power acoustic method and apparatus to levitate and concentrate aerosols and other small liquid/solid samples; an apparatus and method that generates a magnetic field that can simulate a low or an excess-gravitational environment in a localized region such as a small container for purposes of affecting the synthesis of materials; a test chamber suspended in an aircraft performing parabolic flight paths having a self-correcting center of gravity that simulates reduced gravity environments; an apparatus and method comprising an adjustable spring apparatus that is statically-balanced that allows perambulation in a reduced gravity environment for training, educational, recreational and leisurely purposes; a variable gravity field simulator apparatus and method comprising a horizontally movable carriage with a cable attached to a load which experiences the effects of a simulated reduced gravity environment; an apparatus and method comprising an interactive tower track and ride vehicle configured for passenger control during freefalling descent.

With respect to materials synthesis and processing, existing systems include: an apparatus and method that creates a diamagnetic condition induced by a high magnetic field that allows the dynamic control of the growth of a crystal under reduced gravity conditions; an apparatus and method that combines free electrophoresis and multistage extraction to improve separation and purification of cells, particles, protein and solutes; an apparatus and method comprising a drop tube type crystalline body producing device in an electrostatic levitation furnace that allows the solidification of a particulate melt while in freefall; an apparatus and method comprising electrostatic levitation furnace that produces the solidification of a melt under weightless conditions; an apparatus and method for creating cast metal objects utilizing additive manufacturing processes in space.

With respect to cell and tissue bioreactors, existing systems include apparatuses and methods that induce simulated microgravity conditions by utilizing a rotating wall vessel bioreactor to grow living cells and tissues. Related systems, known as classical clinostat, first introduced in 1879 by Julius Sachs, use a similar rotating system but are utilized for seedlings and small plants to assess their gravitropic response. However, none of these systems simulate a key feature of microgravity, namely, the elimination of convective mixing in liquids and gases around test articles.

Thus, there is a need for a universal, ground-based, reduced gravity technology platform comprising a bounded region or volume, such as a chamber or container subjected to an ambient gravitational force field, containing a material system affected by gravitational forces, that is immersed in a non-rotational, dynamic fluid medium, such that freefall conditions are maintained for extended times. The present invention satisfies this need.

SUMMARY OF THE INVENTION

In one aspect, the present invention relates to a reduced gravity system comprising: at least one conduit having at least one lumen in communication with an inlet and an outlet, the inlet positioned at a height below a height of the outlet; a fluid medium flowable through the at least one conduit by a fluid flow inducer; and a bounded chamber sized to freely move within the at least one lumen of the at least one conduit.

In one embodiment, the at least one conduit is aligned at an angle relative to a plane normal to a gravitational pull, the angle being between about 1° and 179°. In one embodiment, the at least one conduit is sized to accommodate the bounded chamber between the inlet and the outlet. In one embodiment, the at least one conduit has an axial length scale greater than an axial length of the bounded chamber. In one embodiment, the at least one conduit has a length between about 1 cm and 100 m. In one embodiment, the at least one conduit has a width or a radius such that the at least one conduit comprises an aspect ratio between an axial length and the width or radius sized to accommodate the bounded chamber between the inlet and the outlet. In one embodiment, the at least one conduit has a width between about 1 cm and 10 m. In one embodiment, the aspect ratio is between about 1:1 and 100:1.

In one embodiment, the fluid medium is selected from water, oils, gels, air, nitrogen, inert gases, single phase fluids, multiphase fluids, and combinations thereof. In one embodiment, the fluid medium is selected for a viscosity, a density, a chemical property (a pH and a polarity), and a flow deformation behavior (Newtonian or non-Newtonian).

In one embodiment, the system further comprises one or more energy sources, fluid reservoirs, sensors, actuators, and controllers. In one embodiment, the one or more sensors are selected from the group consisting of: optical sensors, positioning devices, accelerometers, gyroscopes, ultrasonic sensors, and capacitive displacement sensors. In one embodiment, the one or more actuators are selected from manual, pneumatic, hydraulic, and electric actuators. In one embodiment, the system further comprises one or more energy emitters selected from the group consisting of: lasers, high and low radiant energy emitters, light emitters, infrared emitters, ultraviolet emitters, ultrasound transducers, sonic emitters, radiation emitters, magnetic field emitters, radio wave emitters, x-ray emitters, and electrodes.

In one embodiment, the bounded chamber comprises an outer enclosure surrounding a hollow interior. In one embodiment, the bounded chamber has a geometric shape selected from the group consisting of: a sphere, a disc, a cylinder, a cube, a cone, a rectangular prism, and a box. In one embodiment, the hollow interior comprises a single interior or is partitioned into a multi-compartment interior. In one embodiment, the hollow interior is partitioned into two compartments by a barrier element comprising a ring sized to sealingly fit within the hollow interior, a hollow core sized to sealingly fit within a central hole of the ring, and a plug sized to sealingly fit within the hollow of the core. In one embodiment, the plug is a gate or valve that is openable to unblock the hollow of the core and fluidly connect the two compartments. In one embodiment, the plug comprises a dissolvable or degradable material that melts or breaks apart over time to unblock the hollow of the core and fluidly connect the two compartments. In one embodiment, regions of the outer enclosure of the bounded chamber comprise a semipermeable membrane. In one embodiment, the outer enclosure of the bounded chamber comprises a volume of a fluid that is immiscible with the fluid medium flowable through the at least one conduit. In one embodiment, the bounded chamber has a cross-sectional area that is 50%, 60%, 70%, 80%, 90%, 95%, or 99% of a cross-sectional area of the at least one lumen. In one embodiment, the at least one conduit and the bounded chamber are at least partially transparent or translucent.

In one embodiment, the system further comprises one or more energy emitters selected from the group consisting of: lasers, high and low radiant energy emitters, light emitters, infrared emitters, ultraviolet emitters, ultrasound transducers, sonic emitters, radiation emitters, magnetic field emitters, radio wave emitters, x-ray emitters, and electrodes.

In one aspect, the present invention relates to a method of suspending a chamber in simulated reduced gravity, comprising the steps of: providing a reduced gravity system comprising at least one conduit having at least one lumen extending between an inlet and an outlet, the inlet being positioned at a height below a height of the outlet, and a bounded chamber sized to fit within the at least one lumen; aligning the conduit at an angle relative to a plane normal to a gravitational pull, the angle being between about 1° and 179°; and flowing a fluid into the inlet of the at least one conduit and out of the outlet of the at least one conduit, wherein the fluid has a density that is less than a density of the bounded chamber, and wherein the fluid is flowed at a flow rate that supports the bounded chamber such that the bounded chamber is maintained at a constant position within the conduit.

In one embodiment, the angle of the at least one conduit is varied to alter the amount of gravity experienced by the bounded chamber. In one embodiment, the fluid is selected for a density that is less than a density of the bounded chamber.

In one aspect, the present invention relates to a bounded chamber device, comprising: an outer enclosure surrounding a hollow interior; wherein the bounded chamber device is configured to simulate a gravity environment within the hollow interior near a planetary surface.

In one embodiment, the gravity environment is between about unit gravity and zero gravity. In one embodiment, the hollow interior is partitioned into individual compartments. In one embodiment, the hollow interior is partitioned into two compartments by a barrier element comprising a ring sized to sealingly fit within the hollow interior, a hollow core sized to sealingly fit within a central hole of the ring, and a plug sized to sealingly fit within the hollow of the core. In one embodiment, the plug is a gate or valve that is openable to unblock the hollow of the core and fluidly connect the two compartments. In one embodiment, the plug comprises a dissolvable or degradable material that melts or breaks apart over time to unblock the hollow of the core and fluidly connect the two compartments. In one embodiment, regions of the outer enclosure of the bounded chamber comprise a semipermeable membrane.

In one embodiment, the device is configured to support a process selected from the group consisting of: material synthesis and processing; de novo material synthesis and processing; material structure, property, processing and behavior research; industrial crystallization; thin film deposition and processing; biological and biomaterial synthesis and processing, protein crystallization; drug synthesis and processing; cell, tissue, and organ growth and regeneration; metal processing; glass synthesis and processing; alloy synthesis and fabrication; manufacturing; ceramic synthesis and processing; polymer synthesis and processing; semiconductor synthesis; material assembly and self-assembly; optical fiber fabrication, composite synthesis and processing; component, device, system performance evaluation; additive manufacturing; and biomanufacturing.

In one embodiment, the device is sized for animal and human occupancy. In one embodiment, the device is configured to recreationally simulate reduced gravity. In one embodiment, the device is configured to simulate reduced gravity conditions in a low orbit space vessel.

BRIEF DESCRIPTION OF THE DRAWINGS

The following detailed description of exemplary embodiments of the invention will be better understood when read in conjunction with the appended drawings. It should be understood, however, that the invention is not limited to the precise arrangements and instrumentalities of the embodiments shown in the drawings.

DETAILED DESCRIPTION

Figure 1:
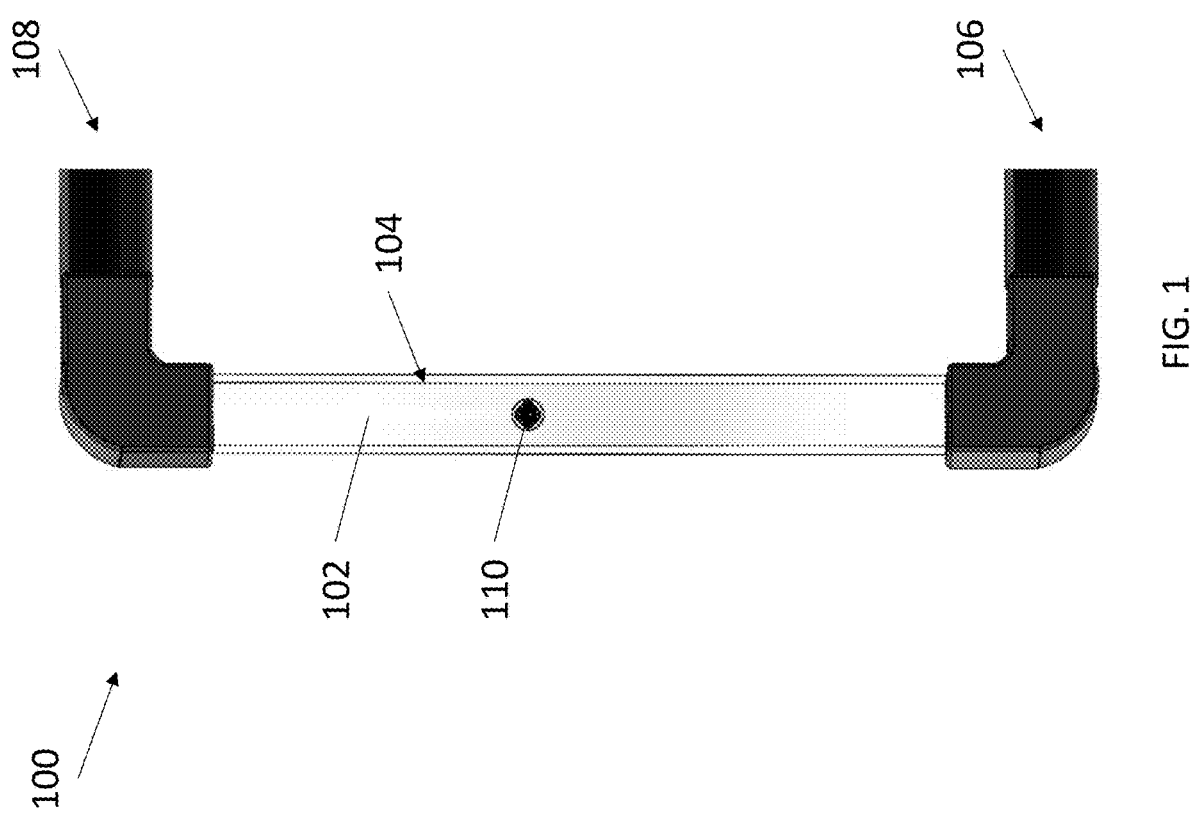
FIG. 1 depicts an exemplary reduced gravity conduit system.

The present invention provides ground-based reduced gravity systems and methods of using the same to evaluate, synthesize, adapt, alter, process and produce diverse material systems, biological and non-biological, living and non-living, at close to true microgravity conditions as that which exist in space, and other reduced gravity conditions.

Definitions

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, the exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

"Bounded" as used herein when referring to a chamber is meant to describe a physical boundary that separates the interior of the chamber from the exterior of the chamber. A bounded chamber thereby prevents the contents of the chamber from freely escaping and mixing with materials exterior to the chamber as well as preventing materials exterior to the chamber from freely entering and mixing with the contents of the chamber. The physical boundary may be a rigid or flexible enclosure. The physical boundary may also be an interface between two immiscible liquids. It should be understood that the physical boundary may selectively permit the entry and exit of particles, such as in the case of semipermeable membranes and ports.

"Sealingly" as used herein is meant to describe an airtight, watertight fitment. A first component that sealingly fits into a second component positions the first component snugly within the second component such that gases, liquids, and solids are prevented from traversing across the sealing fit. A first component that sealingly fits within a hollow interior of a second component can serve to divide the hollow interior of the second component into a plurality of partitions, such that gases, liquids, and solids within each partition are securely isolated from the gases, liquids, and solids of each other partition.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

Reduced Gravity System

Referring now to FIG. 1, an exemplary reduced gravity system 100 is depicted. Reduced gravity system 100 comprises at least one conduit 102 having at least one lumen 104 running between an inlet 106 and an outlet 108. Lumen 104 is sized to fit a bounded chamber 110. Reduced gravity system 100 is configured to accept any suitable fluid through lumen 104. In various embodiments, the fluid can be a gas, a liquid, a gel, or combinations thereof. The flow of fluid can be in a closed circuit, wherein the same volume of fluid is continually passed through conduit 102 in a recirculating mode, or in an open circuit, such that a source of fluid flows through conduit 102 in a single pass. In some embodiments, lumen 104 comprises an internal platform or support that is configured to hold bounded chamber 110 in the absence of a fluid flow. Suitable internal platforms or supports do not obstruct a flow of fluid, and can include but are not limited to mesh or wire plates or one or more rods that at least partially span a width of lumen 104.

In some embodiments, inlet 106 is positioned at a height lower than a height of outlet 108, such that a fluid flowing through lumen 104 flows against the pull of gravity, and a bounded chamber 110 positioned within lumen 104 is pulled by gravity towards inlet 106. Conduit 102 can thereby be placed in any orientation that maintains the relative positioning between inlet 106 and outlet 108. For example, the orientation of conduit 102 can be described in terms of an angle between a longitudinal axis of conduit 102 and a horizontal plane, wherein a fully upright conduit 102 is oriented at a 90° angle from the horizontal plane. In this configuration, the orientation of conduit 102 can have any desired angle between about 1° and 90° relative to a horizontal plane. In certain embodiments, orienting conduit 102 at 90° relative to a horizontal plane simulates microgravity in bounded chamber 110, while orientating conduit 102 at an angle between about 1° and 90° relative to a horizontal plane simulates reduced gravity in bounded chamber 110.

Reduced gravity system 100 is configured to simulate microgravity and reduced gravity in bounded chamber 110 by providing a flow of a fluid against the pull of gravity at a rate that supports the weight of bounded chamber 110. In this manner, bounded chamber 110 is maintained at a constant position within conduit 102, essentially in sustained freefall. To this end, reduced gravity system 100 can further comprise one or more fluid flow inducers (e.g., pumps), energy sources, fluid reservoirs, sensors, actuators (manual, pneumatic, hydraulic, electric, etc.), controllers (proportional (P), integral (I), derivative (D), and combinations thereof such as PI, PD, PID, in non-embedded form or as microcontrollers), and the like. In certain embodiments, reduced gravity system 100 can be operated manually, wherein an operator can manually control the flow rate of a fluid through conduit 102 to maintain bounded chamber 110 at a constant position. Manual operation can be aided by the addition of one or more external or internal markings on conduit 102 to monitor a position of bounded chamber 110. In certain embodiments, reduced gravity system 100 can be operated automatically, wherein fluid flow rate can be monitored by one or more flow sensors; bounded chamber 110 can be monitored by one or more optical sensors, positioning devices, accelerometers, gyroscopes, ultrasonic sensors, capacitive displacement sensors, and the like; and a controller can automatically adjust pump speed and flow rate to maintain bounded chamber 110 at a constant position. Automatic adjustment is helpful in cases wherein the mass of the contents of bounded chamber 110 is variable, requiring adjustments to flow rate as the mass changes. In various embodiments, reduced gravity system 100 can support an array of conduits 102, wherein each conduit 102 can be monitored and controlled simultaneously, sequentially, or asynchronously.

In various embodiments, reduced gravity system 100 can further include one or more energy transmitters. Contemplated energy transmitters include but are not limited to lasers, high and low radiant energy, light at various wavelengths, infrared emitters, ultraviolet emitters, ultrasound transducers, sonic emitters, radiation emitters, magnetic field emitters, radio wave emitters, x-ray emitters, electrodes, and the like. The energy transmitters can be selectively aimed at a point, a section, or the entirety of conduit 102, bounded chamber 110, or both to interrogate conduit 102 and bounded chamber 110 with energy. The energy transmitters can be useful in any number of applications, including but not limited to electroporation, photoporation, photocrosslinking, heating, radiation therapy, magnetic therapy, and the like.

Bounded chamber 110 is a vessel sized to fit and freely move within lumen 104. Bounded chamber 110 comprises an outer enclosure surrounding a hollow interior. The outer enclosure prevents convective mixing between the contents of the hollow interior and a flow of fluid passing through lumen 104. The hollow interior can be partitioned into any number of compartments and is configured to house any desired operation, including but not limited to reactions, experiments, studies, manufacturing processes, fabrication processes, therapies, and the like. As such, bounded chamber 110 encompasses a large range of vessels, ranging from small containers to room-sized and building-sized constructs that are configured for human occupancy and/or habitation. While bounded chamber 110 is depicted as having a spherical shape, bounded chamber 110 is not limited to any specific geometry. Contemplated shapes include but are not limited to spheres, discs, cylinders, cubes, boxes, and the like.

In certain embodiments, bounded chamber 110 can be partitioned to have a plurality of compartments, each compartment housing a reactant. The compartments can be timed or controlled to release the reactants into each other after reduced gravity or microgravity is attained. In some embodiments, the compartments can fluidly connect to a main combining chamber, such that the reactants can be simultaneously or sequentially combined after reduced gravity or microgravity is attained. Contemplated applications for bounded chamber 110 include but are not limited to: material synthesis and processing; de novo material synthesis and processing; material structure, property, processing and behavior research; industrial crystallization; thin film deposition and processing; biological and biomaterial synthesis and processing, protein crystallization; drug synthesis and processing; cell, tissue, and organ growth and regeneration; metal processing; glass synthesis and processing; alloy synthesis and fabrication; manufacturing; ceramic synthesis and processing; polymer synthesis and processing; semiconductor synthesis; material assembly and self-assembly; optical fiber fabrication, composite synthesis and processing; component, device, system performance evaluation; additive manufacturing; and biomanufacturing, and the like.

In certain embodiments, bounded chamber 110 is a room-sized or building-sized construct. Bounded chamber 110 can be scaled to permit the occupancy of animals and humans and include habitation quarters, laboratory quarters, storage quarters, and the like. Accordingly, bounded chamber 110 can be used as a base of operations for microgravity and reduced gravity experiments in the short-term and the long-term. In some embodiments, a room-sized or building-sized bounded chamber 110 can be used to replicate conditions in a space vessel, such as a space capsule, a space shuttle, or a space station. For example, a room-sized or building-sized bounded chamber 110 can be used to replicate, validate, or replace experiments conducted in low orbit (such as on the International Space Station) or in outer space. In some embodiments, bounded chamber 110 can be used for recreational or training purposes. A ground-based reduced gravity or microgravity system that operates at a room-scale or building-scale can be a cost-effective, safe, and more accessible way of replicating the experience of riding a reduced-gravity aircraft for entertainment or for training animals and humans for reduced gravity and microgravity operations.

Figure 2:
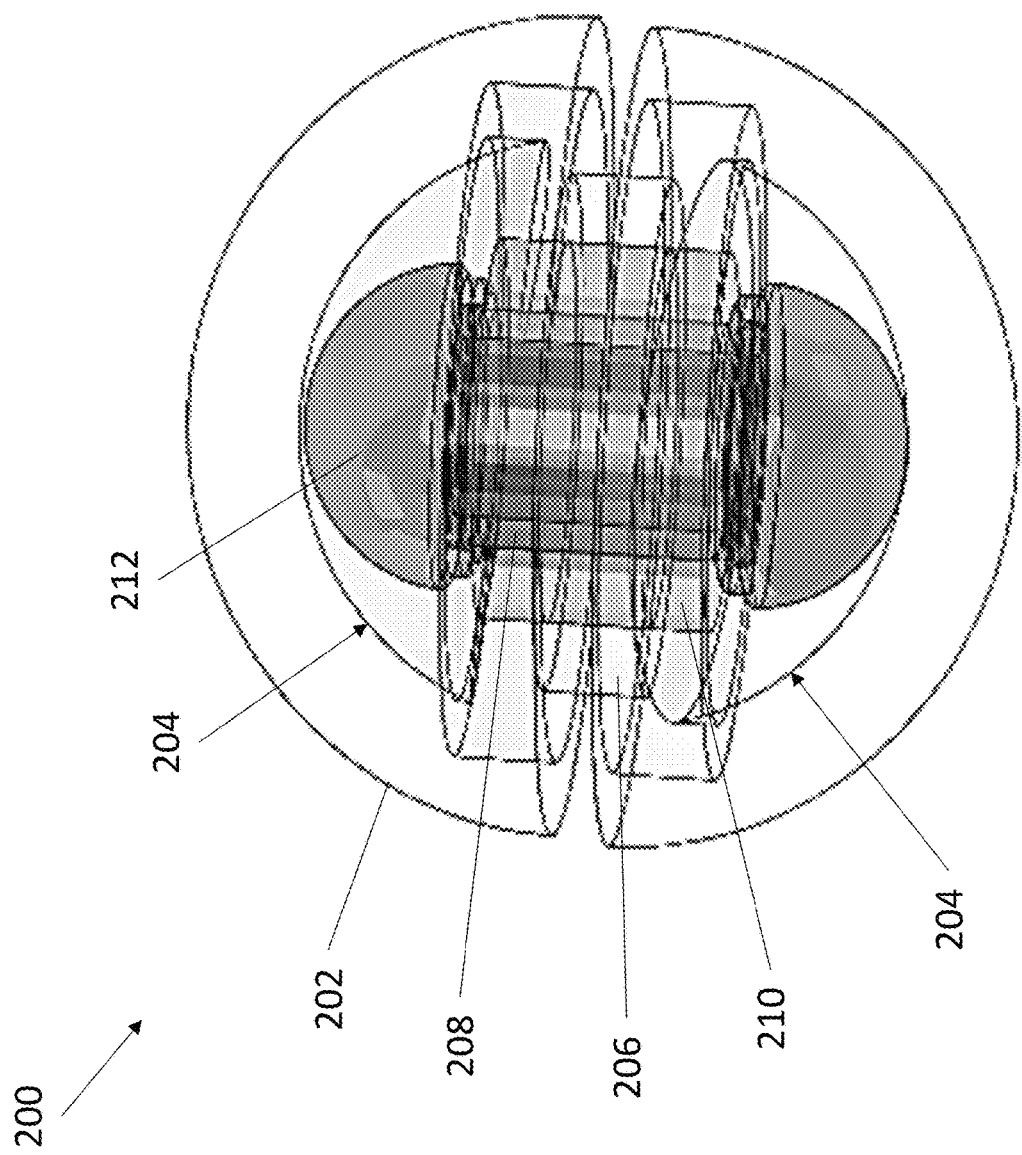
FIG. 2 depicts an exemplary bounded chamber.
Figure 3:
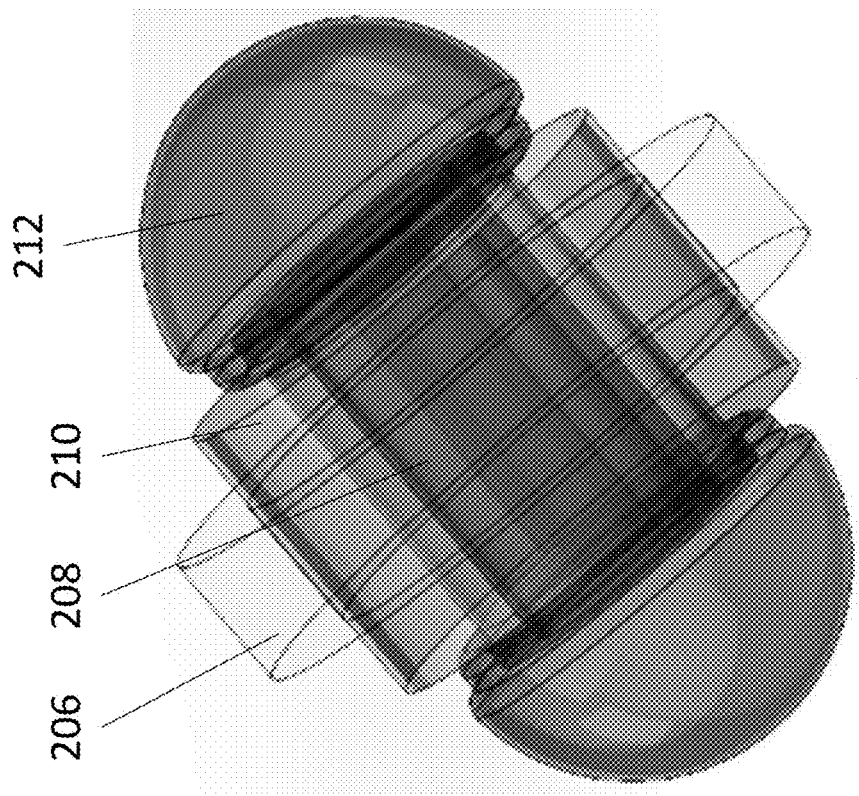
FIG. 3 depicts perspective views of an exemplary bounded chamber barrier element (left) and with a plug (right).
Figure 3:
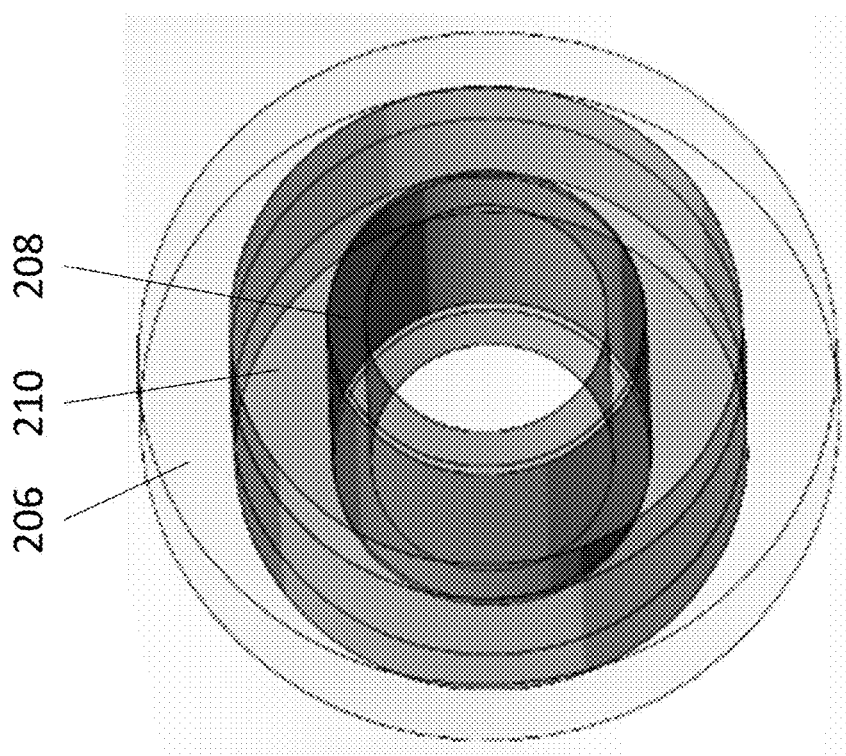

Referring now to FIG. 2 and FIG. 3, an exemplary bounded chamber 200 is depicted. Bounded chamber 200 comprises a spherical outer enclosure 202 encasing a hollow interior 204. Hollow interior 204 is partitioned into two halves by a barrier element constructed from ring 206, core 208, and plug 212. In some embodiments, the barrier element can further include a spacer 210 positioned between ring 206 and core 208. Ring 206 has a flattened disc shape with an outer diameter sized to sealingly fit within hollow interior 204 and a central hole sized to fit core 208. Core 208 comprises a hollow cylindrical shape with an outer diameter sized to sealingly fit within the hollow inner diameter of ring 206. Plug 212 is sized to sealingly fit within the hollow interior of core 208. Plug 212 comprises a mechanism that temporarily obstructs the hollow interior of core 208, such that after upon activation of the mechanism, plug 212 unblocks the hollow interior of core 208 to fluidly connect the partitioned halves of hollow interior 204. In some embodiments, the mechanism of plug 212 is mechanical, such as a gate or valve that opens electronically after a set time or by remote activation or that opens after a wind-up mechanism has expended an amount of stored energy. In some embodiments, the mechanism of plug 212 is material-based, such as an ice plug, a dissolvable plug, or a degradable plug that melts or breaks apart over time. In this manner, bounded chamber 200 is configured to store materials in each of the two partitions, and after a delay, mix the two partitions. Providing a delayed mixing is necessary when a reaction between two materials is desired after microgravity or reduced gravity conditions are established within hollow interior 204.

In various embodiments, the bounded chambers of the present invention can be modified as appropriate for certain applications. For example, in certain embodiments wherein a bounded chamber houses an operation that requires wired connections, a fluid or material transfer system, or some other temporary or sustained connection to a system external to reduced gravity system 100 during use, a bounded chamber can include a tether or conduit that can be temporarily connected or permanently connected to the external system. The external system can include energy sources, growth media cycling systems, air or gas tanks, waste removal systems, specimen transfer systems, and the like. In certain embodiments, a bounded chamber can include a semipermeable outer enclosure or regions of the outer enclosure comprising a semipermeable membrane. For example, a bounded chamber may house a cell culture, a tissue culture, or some other live organism culture. A bounded chamber may be suspended in a flow of fluid having gases or nutrients that are diffusible across a semipermeable outer enclosure into the interior of a bounded chamber. Likewise, waste material and analytes of interest may diffuse across the semipermeable outer enclosure out of a bounded chamber and into the flow of fluid for removal or sampling. In some embodiments, a bounded chamber may comprise a pocket of a first fluid suspended within a flow of a second fluid that is immiscible with the first fluid, wherein the outer enclosure is formed by the immiscible interface between the first fluid and the second fluid.

Reduced gravity system 100 can have any suitable dimensions. For example, in some embodiments, conduit 102 has an axial length scale that is greater than an axial length of bounded chamber 110. In some embodiments, conduit 102 has a width or radius such that its aspect ratio relative to its axial length is sufficient to accommodate bounded chamber 110 between inlet 106 and outlet 108. In some embodiments, conduit 102 can have any suitable length (i.e., height) or width, including but not limited to a length between about 1 cm to about 100 m or more and a width between about 1 cm to about 10 m or more. In some embodiments, conduit 102 has an aspect ratio of length to width between about 1:1 and about 100:1. While conduit 102 is depicted as being tubular in shape, it should be understood that conduit 102 can have any desired construction, including square cross-sections, rectangular cross-sections, ovoid cross-sections, and the like. Likewise, a bounded chamber can have any suitable dimensions that fit within conduit 102. In some embodiments, conduit 102 can have an annular cross-section, such that concentric conduits form an innermost lumen that is open to the atmosphere and a ring-shaped lumen through which a fluid can flow. Accordingly, a bounded chamber can have a donut-shape to fit within a conduit 102 having an annular cross-section. In some embodiments, the size of a bounded chamber can be defined as having a cross-sectional area that is a proportion of a cross-sectional area of lumen 104. For example, a bounded chamber can have a cross-sectional area that is 50%, 60%, 70%, 80%, 90%, 95%, or 99% of a cross-sectional area of lumen 104.

Reduced gravity system 100 can be constructed from any suitable material, such as metals, plastics, and polymers including but not limited to: stainless steel, titanium, aluminum, silicones, PVC, polyethylene, and the like. In some embodiments, certain components or portions of certain components can be constructed from a transparent or translucent material. The components can be made using any suitable method known in the art. The method of making may vary depending on the materials used. For example, components substantially comprising a metal may be milled from a larger block of metal or may be cast from molten metal. Likewise, components substantially comprising a plastic or polymer may be milled from a larger block, cast, or injection molded. In some embodiments, the components may be made using 3D printing or other additive manufacturing techniques commonly used in the art. In some embodiments, the methods can embed additional components, such as circuitry, electrodes, magnets, diodes, and the like, such that the resulting system can be electrified to support electroporation, photoporation, electrophoresis, magnetic fields, and the like. In various embodiments, coatings, patterns, and other finely detailed features can be applied using techniques such as etching, lithography, deposition, spin coating, dip coating, and the like.

Methods of Use

The present invention also includes methods of using reduced gravity systems to simulate microgravity and reduced gravity conditions. As described elsewhere herein, the reduced gravity systems of the present invention are capable of suspending a bounded chamber in a fluid flowing against gravity, sustaining the bounded chamber and its contents in a constant state of freefall.

The unique capabilities of the reduced gravity system affords diverse groups of materials researchers, materials processors, and product developers the capability to evaluate the effects of partial/reduced gravity analogs and, in particular, microgravity, on physical, chemical and biological materials and processes in support of the development of new materials and associated manufacturing processes that are relevant to Earth-bound product applications, as well as, space exploration and development applications; manufacture engineered materials with more deliberate control of atomic and molecular structures and properties which is not possible to attain at ground conditions; operate and evaluate devices and systems under true microgravity conditions; scale and customize the reduced gravity system; and operate the reduced gravity system at reduced gravity conditions over a wide range of processing times and length scales.

Figure 4:
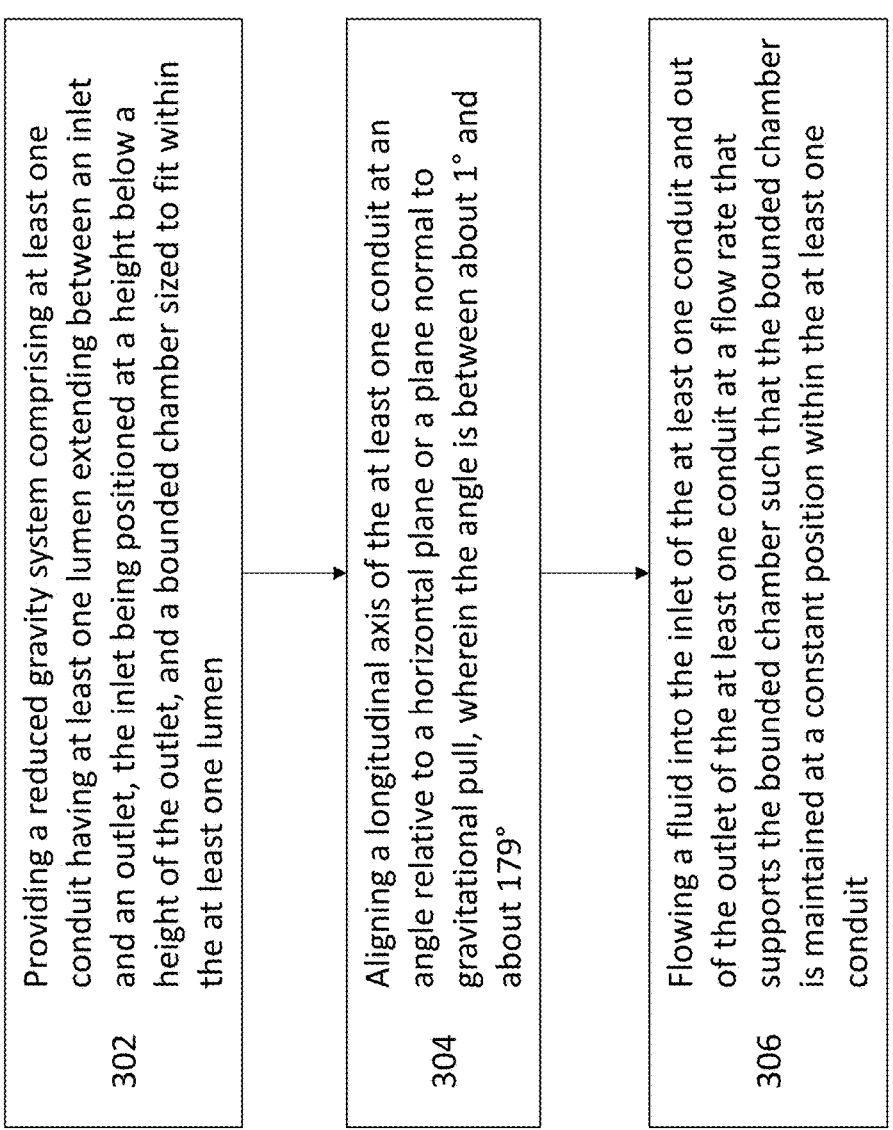
FIG. 4 is a flowchart depicting an exemplary method of suspending a chamber in simulated reduced gravity.

Referring now to FIG. 4, an exemplary method 300 of suspending a chamber in simulated reduced gravity is depicted. Method 300 begins with step 302, wherein a reduced gravity system is provided, the reduced gravity system comprising at least one conduit having at least one lumen extending between an inlet and an outlet, the inlet being positioned at a height below a height of the outlet, and a bounded chamber sized to fit within the at least one lumen. In step 304, a longitudinal axis of the conduit is aligned at an angle relative to a horizontal plane or a plane normal to gravitational pull. The angle can be any desired angle, such as an angle between about 1° and about 179°. In some embodiments, the angle may be 1°, 5°, 10°, 20°, 30°, 40°, 45°, 50°, 60°, 70°, 80°, 90°, 100°, 110°, 120°, 130°, 135°, 140°, 150°, 160°, 170°, 175°, 179°, or any angle or range of angles between these values. In some embodiments, the angle of conduit 102 can be varied to alter the amount of gravity experienced by a bounded chamber. In step 206, a fluid is flowed into the inlet of the conduit and out of the outlet of the conduit at a flow rate that supports the bounded chamber such that the bounded chamber is maintained at a constant position within the conduit. Contemplated fluids include but are not limited to water, cell growth media, serum, plasma, oils, gels, gases, nitrogen, inert gases, air, single phase fluids, multiphase fluids, fluid mixtures, and the like. In some embodiments, the fluid can be controlled for temperature, pH, polarity (polar or non-polar), viscosity, density, pressure, chemical properties, flow deformation behavior (Newtonian or non-Newtonian fluids) and the like.

In certain embodiments, the fluid is selected depending upon the density and shape of the bounded chamber. As described elsewhere herein, a sensation of weightlessness can be produced in a bounded chamber after reaching terminal velocity in a flow of fluid due to local drag forces that support the bounded chamber's weight. Selection of an appropriate fluid can be performed as follows: for a solid ball with mass $M_B$ and diameter $D_B$ falling in a fluid medium at constant temperature, a free body force diagram indicates that the object with mass $M_B$ falls only in the y-axis and thus there are no force interactions in the x-axis. In this case, the forces that interact with the object include (a) the buoyancy force $F_b$, (b) the force of gravity $F_g$ pulling the object downwards towards the center of mass of the Earth; and (c) the drag force D which arises from the interaction of the media with the surface area of the object. Thus, the force balance for this system is:

$$\Sigma F_x + \Sigma F_y + \Sigma F_z = M*a \qquad \text{Eq. (1)}$$

Noting that there is no motion in z or x-axis, i.e., $$\Sigma F_x = 0, \Sigma F_z = 0$$

Then, if the gravitational force acting downward in the y-direction were countered only by form drag D (air or fluid resistance) and buoyancy forces ($F_b$), then the force balance for this condition would be:

$$\Sigma F_y = D + F_b - F_g = M*a \rightarrow D + Fb = Fg \qquad \text{Eq. (2)}$$

Where form drag, D, can be expressed in terms of the following variables:

$$D = C_d * \frac{1}{2} * \rho_M * v_T^2 * A_B \qquad \text{Eq. (3)}$$

Where $C_d$ is the drag coefficient, $\rho M$ [Kg/m³] is the density of the media, and AB is the surface area of the object and where $$A_B = \frac{\pi}{4} * D_B^2 [m^2].$$

The buoyancy force, $F_b$, is defined in Equation 4 below:

$$F_b = V_B * \rho_M * g [N] \qquad \text{Eq. (4)}$$

Where ($V_B$) is the object's volume $$\left(\text{where } V_B = \frac{\pi}{6} * (D_B)^3 [m^3] \text{ for a shpere}\right)$$

$\rho m$ [Kg/m³] is the density of the media, and g is acceleration due to gravity. Also, recalling that the force acting on the object due to gravity is:

$$Fg = M_B * g [N] \qquad \text{Eq. (5)}$$

Then it follows that:

$$Fg = V_B * \rho_B * g [N] \qquad \text{Eq. (6)}$$

Solving Equation 3 for terminal velocity and substituting various terms, one can arrive at the following terminal velocity expression Equation 7 for free fall:

$$v_T = \sqrt{\left(\frac{4}{3} * D_B * g * (\rho_B - \rho_M)\right)/(\rho_M * C_d)} \quad \left[\frac{m}{s}\right] \qquad \text{Eq. (7)}$$

Upon inspection of Equation 7, it can be seen that terminal velocity is directly proportional to the diameter of a spherical object ($D_B$), the density difference between the object ($\rho_B$) and the media ($\rho_M$), and the acceleration of gravity (g), as well as inversely proportional to the drag coefficient ($C_d$) and density of media ($\rho_M$). As long as there exists relative motion between the object and the media, there exists a drag force and an associated coefficient of drag, $C_d$. $C_d$ is dependent on the physical properties of the media and is also proportional to the Reynolds number ($R_e$) of the media. The Reynolds number, a dimensionless constant defined as the ratio of inertial forces verse viscous forces, is used to determine the drag force arising from the relative motion of objects immersed in fluids including those in free fall. The drag force depends on $R_e$ and the shape of the object. In order to determine terminal velocity, it is important to define the Reynolds number for the system of interest which, for a given object geometry, can then be used to determine the drag coefficient $C_d$.

In general, the Reynolds number can be divided into four distinct regions: Region I: $R_e$<0.3; Region II: 0.3<$R_e$<1000; Region III: 1000<$R_e$<200000; and Region IV: $R_e$>20000. For a given region and object geometry, modified versions of the terminal velocity equation are applicable.

In Region I, in the example of a spherical object moving through a medium, such as a gas or liquid, experiences drag forces ($F_d$) in the direction opposite to its downward motion due to gravitational forces ($F_g$). Terminal velocity is achieved when the drag force is equal in magnitude but opposite in direction to the gravitational force pulling the object. The terminal velocity for objects in Region I is given in Equation 8 where $\mu_M$ is the dynamic viscosity of the medium, g as defined above as the acceleration of gravity, $D_B$ is the ball diameter, $\rho_B$ denotes the density of the ball, and $\rho_M$ is density of the medium. The constant 18 represents the value of the coefficient of drag at this dynamic condition.

$$v_t = (g*N*(\rho_B - \rho_M))/(18*\mu_M) \, [m/s] \qquad \text{Eq. (8)}$$

With reference to Equation 8, for a spherical solid object freefalling through media in Region I, terminal velocity of the object depends on the diameter and density of the object. As long as the density of the object exceeds the density of the medium that it is falling in, there will be a terminal velocity associated with the object.

In Region II, in the example of an object having a larger surface area and mass, the force of drag from air and gravity are larger; therefore the Reynolds number also is different and higher. For a spherical object, the $C_d$ can be determined via Equation 9 as shown below:

$$c_d = \frac{18.5}{R_e^{0.6}} \qquad \text{Eq. (9)}$$

In Region III, the coefficient of the drag almost has a constant value with respect to the geometry of a system in free fall. For example in the case of a spherical object, $C_d$ is 0.44, therefore the terminal velocity equation for the spherical object can be modified as shown in Equation 10

$$v_r = 1.74 * \sqrt{\frac{g * D_B * (\rho_B - \rho_M)}{\rho_M}} \, [m/s] \qquad \text{Eq. (10)}$$

In essence, the fluid can be selected based upon the density of the bounded chamber, wherein the density of the bounded chamber is greater than the density of the fluid. In some embodiments, it may be more feasible to alter the density of the bounded chamber to be greater than the density of a selected fluid. For example, one or more weights can be added to the bounded chamber, or the bounded chamber can be encased in a higher density enclosure.

The methods can be useful in the fields of materials science and engineering, research, and development associated with materials, component, and device manufacture. In addition, there are numerous related existing and emerging fields and industries that study, develop, modify and utilize manufactured or self-assembled materials on Earth, as well as, emerging industries that envision the utilization of manufactured or self-assembled materials in other environments, such as, space, among other so-called extreme environments.

Additional relevant fields include but are not limited to physical sciences (e.g., chemistry, biochemistry, physics, geology, geography), life sciences (e.g., biology, developmental biology, microbiology, reproductive biology, immunology, medical sciences); engineering (e.g., aerospace engineering, bioengineering, chemical engineering, civil and construction engineering, computer science and engineering, electrical engineering, materials science and engineering, mechanical engineering, nuclear engineering); biotechnology; information/communication technology; microelectronics/electronics; and the like.

The methods are also useful in manufacturing and fabrication in relevant industries including but not limited to: aerospace, automotive, chemical, clothing, construction/housing, cosmetic, energy, healthcare, food, manufacturing, medical device/technology, micro/nano electronics, pharmaceutical, transportation, and the like. Likewise, the methods can be useful in operating, evaluating, and validating devices and systems, such as analytical equipment, medical devices, bioreactors, among others under reduced gravity conditions for both ground and space applications.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out exemplary embodiments of the present invention, and are not to be construed as limiting in any way the remainder of the disclosure.

Example 1: Investigating Mineralization Processes Under Simulated Microgravity Free Convectionless Conditions in Unit Gravity Environment The following study explores the feasibility of a test system that simulates microgravity conditions while operating in unit gravity environments. The study also evaluates the test system by examining the nucleation and growth of calcium carbonate ($CaCO_3$) crystals in microgravity conditions.

Calcite Mineralization

One objective of this study was to develop standard techniques to reproducibly carry out a calcite mineralization reaction, as described in Equation 1 below under unit gravity, for selected chemical precursor concentrations and desired environmental conditions. In addition, selected characterization techniques were also performed and are described in more detail below.

$$CaCl_2 + NaCO_3 \rightarrow CaCO_3 + 2NaCl \qquad \text{Eq. (11)}$$

Calcite Precursor Concentration: Effect on $CaCO_3$ Nucleation and Growth

Stock solutions of $CaCl_2$ (Sol A) and $NaCO_3$ (Sol B) served as precursors to calcium carbonate ($CaCO_3$) formation. Starting with the solubility limit of calcium chloride (0.0745 g of $CaCl_2$ in 1 mL of deionized (DI) and Reverse Osmosis water, serial dilutions were made to this saturated level of calcium chloride (Sol A). Similarly, a series of sodium carbonate solutions (Sol B) were also made starting with its solubility limit in water (0.0714 g $Na_2CO_3$ in 1 mL of DI water) at T=25° C., and pH=7. Solutions (A and B) were made via dissolving solid chemical in the DI water and stored in clean 250 mL glass bottles. Variances in weight measurements were +/−5%.

Calcite mineralization studies conducted at unit gravity conditions were performed as follows. Clean plastic pipettes were used to transfer 2 mL of both Sol A and Sol B from glass bottles containing stock precursor solutions into a clean test tube and then mixed gently. Formation of calcite was qualitatively determined as the time when the clear mixture of Sol A and Sol B underwent a clearly observable color change to the naked eye. Calcite formation was also quantitatively verified by x-ray diffraction (XRD). Note there were two sets of test tubes used; one set for control containing only clear DI water and the other contained the mixed calcite precursor solution. The blue color background and the light fixture fixed above the reaction were utilized to enhance direct visualization of calcite formation.

Rates and mechanisms of mineral formation and transformation are regulated by conditions in the solution and at the solution-mineral interface. Thermodynamic factors regulate mineral crystallization processes, and include solution pH, degree of mineral saturation, ionic strength, temperature, and the extent of ion association. In this study, only the effects of solution pH and surface energy on calcite mineral formation were investigated.

Effect of pH on Calcite Formation Change

The effect of pH on calcite formation was conducted by varying the pH (5<pH<7) of the distilled (DI) water used in the calcite mineralization experiments.

Effect of Surface Energetics on Calcite Nucleation

In heterogeneous nucleation of minerals, such as calcite, stable solid calcite nuclei form at the solution-mineral interface, i.e., on the walls of the container and only if the activation energy barrier in the system is surmounted. As such, the potential effect of glass and plastic mixing chambers, i.e., test tubes, may have on the nucleation and growth of calcite warranted a preliminary investigation of the effect of surface energetics on calcite nucleation and growth. Calcite nucleation and growth was studied in the presence of different reaction chamber systems by mixing calcium chloride [$CaCl_2$=0.0018625 g/mL] to sodium bicarbonate [$Na_2CO_3$=0.001785 g/mL] and captured using a 1/4000 (s) camera. Calcite sample for XRD verification was collected using microfiltration separation methods.

Calcite Reaction Chamber

As the purpose of this study was to explore the nucleation and growth of calcite in microgravity conditions in a unit gravity environment, the design of a novel test system was required and requisite to attaining the objectives of this project. The design goal was to design a reaction housing that allowed the mixing of the two separated calcite precursors to occur in a clear, solid chamber held at terminal velocity conditions. It is also important that this reaction chamber allow for the in situ reaction of precursors Sol A and Sol B to begin only after the chamber is placed under microgravity conditions and that the reaction be allowed to proceed thereafter under microgravity influence. Another crucial design specification is that the reaction chamber, envisioned to be run immersed in a dynamic, fluid flow system as a practical means of minimizing any external forces, would be free of bulk convective fluid motion as it would avert a free-convection-less condition that is to be maintained as the reaction proceeds One of the dominant concepts for the reaction chamber design that was considered in concept generation was a system comprising a clear plastic shell made of two halves that contained a reservoir chamber that had the ability to fill and store calcite precursors Sol A and Sol B in separated compartments until a predetermined time period had elapsed before inducing mixing of these precursor solutions.

Translation of this concept into an experimental reactor test system led to the development of a spherical housing containing two compartments, each having two small access ports, with one used to inject calcite reactants while the other served as an air vent to allow air to be displaced from the chamber and vented into the atmosphere. The reaction chamber housing was devised from the modification of a clear plastic capsule used to contain small toys in larger packages for sale in retail stores and also used in commercial toy vending machines. Comprising an empty clear plastic sphere with a diameter of 15.5 mm, two holes were drilled at the apex of each half.

1 mL of solutions A and B of known concentrations were infused via a disposable syringe gauge 18 into each half reaction chamber that were separated with a temporary barrier in a sequential manner to avoid premature mixing while allowing air to be displaced and vented into the atmosphere via the other hole. After filling the fluid reservoirs, both the injection and air displacement ports were sealed with Parafilm. Note that it was important to maintain the center gravity of the reaction chamber at or very near the chamber midsection to minimize chamber rotation and inadvertent fluid mixing in the reaction chamber when placed in a flow field. Sol A and Sol B densities were determined using a pycnometer and adjusted accordingly when desired.

A key design feature needed was a reaction chamber element that could function in a manner to delay the induction of calcite precursor solutions from mixing until such time was desired and without interfering with subsequent chemical reaction mechanisms once employed. Such a reaction chamber feature would need to meet the delay time necessary to assemble the reaction chamber and prime with Sol A and Sol B while still having additional time to place the chamber in a microgravity test system (described in more detail below) that was allowed to utilize additional time to achieve microgravity conditions prior to mixing the calcite reactants.

The design concept that met the specifications required for this reaction chamber feature was a glass tube transfixed across a thin, solid circular Plexiglass element. The key feature of this composite structure was the ability to temporarily immerse this element in a separate spherical housing of slightly smaller diameter than the reaction chamber and then filled with water after which was subsequently frozen. Once this middle layer ice barrier element was frozen, it could then be placed snugly into the reaction chamber to serve as a reactor mixing delay element.

Once fully assembled, it was then possible to inject the calcite reactants (Sol A/Sol B), as briefly described above, into the reactor chamber and then subsequently place the reactor chamber immediately in the microgravity test system, described below, with enough time to allow the test system to achieve microgravity conditions prior to ice melting and subsequent mixing of reactants. As depicted schematically in FIG. 3, left (no ice) and FIG. 3, right (with ice), this middle layer ice barrier element consist of four components: a solid continuous ice section in the shape of a dumbbell (0.8 mL $H_2O$), a glass cylindrical core (7.5×3×4 $mm^3$), a flexible plastic layer, and a rigid Plexiglass plastic ring (1×2×13.5 $mm^3$) that is force fitted in the middle section of the reaction chamber housing. Each reactor chamber component was wrapped with Parafilm to avoid reactant leakage and dilution.

Figure 5:
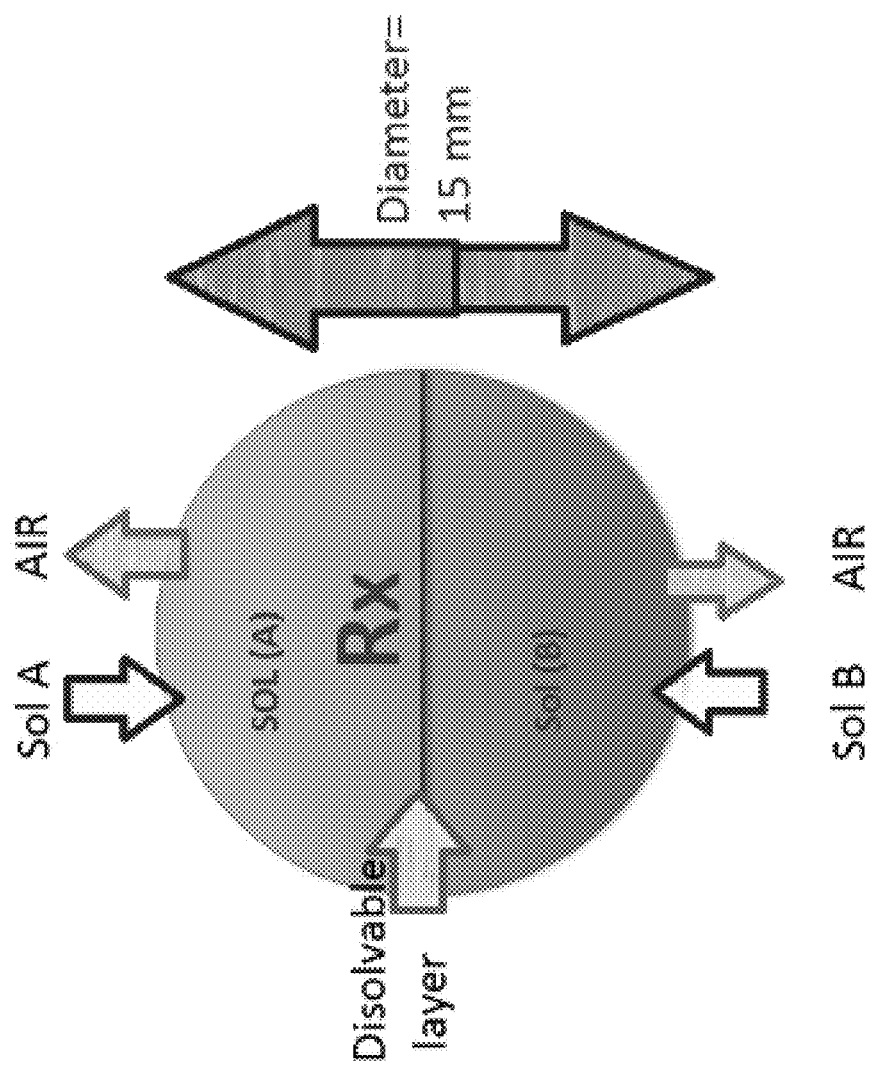
FIG. 5 depicts a schematic of an exemplary reaction chamber.

When fully assembled, the reaction chamber system has the capacity to hold fluid (reactants), up to 1 mL, remove an equal volume of displaced gas (air), separate reactants for a desired time delay period, and fit into microgravity-induced fluid experimental systems that can house spherical reactor systems up to 1.5 cm in diameter as shown in FIG. 2. A schematic depiction of a fully assembled reactor chamber is shown in FIG. 5.

Note that the dilution effects from the dissolution of the middle ice barrier was accounted for in the calcite reaction tests conducted under both unit gravity and simulated microgravity conditions. With the design of the reactor chamber completed, the remaining portion of the experimental section describes the simulated microgravity test systems devised and operational procedures and conditions.

Simulated Microgravity Test Systems and Environment

Recalling that the hypothesis of this investigation was to determine the feasibility of investigating mineral nucleation and growth in a simulated microgravity environment in a manner that can be compared to the same reaction conducted under unit gravity conditions, it was also necessary to devise microgravity test systems that would allow the particles arising from calcite nucleation and growth to achieve 'terminal velocity conditions.' Another requirement of these microgravity test systems was that they are absent of appreciable bulk flow conditions in the reaction chamber that emanate from external fluid flow perturbations. This requirement would assure that free convection effects arising from within a reaction chamber that was operating under gravitational force fields would be essentially absent under simulated microgravity conditions.

With these experimental test specifications now met, an experimental system was designed and utilized in this study comprising a vertical rigid conduit design that simulated microgravity in a manner akin to well-known 'free fall in an elevator' condition.

Vertical Conduit Simulated Microgravity System

Figure 6:
FIG. 6 depicts an exemplary vertical conduit simulated reduced gravity system.

The goal was to develop a practical to use bench top model that simulates microgravity. One attractive system, shown in FIG. 6, operates with a one directional, single pass flow of $H_2O$ (from a laboratory faucet) and is simple to assemble and disassemble. As such, it can accept the reactor chamber housing within a time frame that does not exceed the time of ice dissolution from the middle layer separation barrier. This test device is quite simple to construct and use. It is constructed from a clear plastic tube (30×38×360 mm) for flow and visualization, connectors, and flexible tubing (swimming pool draining hose—diameter of 44 mm and length 640 mm and 510 mm). The remaining components included 20 cm connectors, hose clamps, and Parafilm and Teflon tape. Connected to the sink and flow of the water, this system allows for 1-D flow from bottom to the top of the clear tube pathway. Changes in reactor chamber density over reaction time are compensated with increased external flows.

In operation, the fully prepared and assembled reactor chamber (spherical ball with an external weight) was dropped into the flow field of the vertical conduit test section from the top of the clear tube that was made easily removable. Once the reactor chamber was maintained at a fixed height that essentially indicated terminal velocity conditions were achieved, direct visualization of calcite formation was used to determine any differences in formation time between unit gravity and simulated microgravity experimental results.

Material Characterization and Verification

The goal of this study was to examine the effects of microgravity on incipient mineralization of calcite. Additional modifications of the reaction chamber housing were also necessary to account for density differences arising from calcite nucleation and growth occurring in microgravity conditions. Specifically, this entailed modifying the density of the clear plastic housing of the reaction chamber by adding a copper paste (density=7.8 $gr/cm^3$), comprising a copper plastic coloring and clear nail polish as an adhesive.

Color changes arising from the Tyndall effect were utilized to determine relative calcite formation under both unit and microgravity conditions was also utilized. The interactions of light with the surface of the particles allows for color change; in this case the color change is from clear to white.

In addition to determining calcite formation by direct visualization techniques, staining methods were used. For calcium-based crystals, Alizarin Red was used, which when reacting with calcium, the test fluid changes from red-orange to dark pink. As such it was used to identify the existence of calcium in calcite reactions. Limitation on the staining is dependent on the condition that alizarin was developed as well as pH sensitivity.

Distribution of calcite particles included optical microscopy, scanning electron microscopy (X1-30) (SEM). Dynamic Light Scattering (DLS) was performed with a Beckman Coulter Delsa nano system, provided quantitative, real time dynamic information of the nucleation and growth of calcite. DLS was used to characterize calcite nucleation and growth, i.e., size and size distribution s in real time) in both unit and microgravity conditions. Finally, X-Ray diffraction was utilized to verify calcite formation using a white powder in the system.

Simulated Microgravity Result

Figure 7:
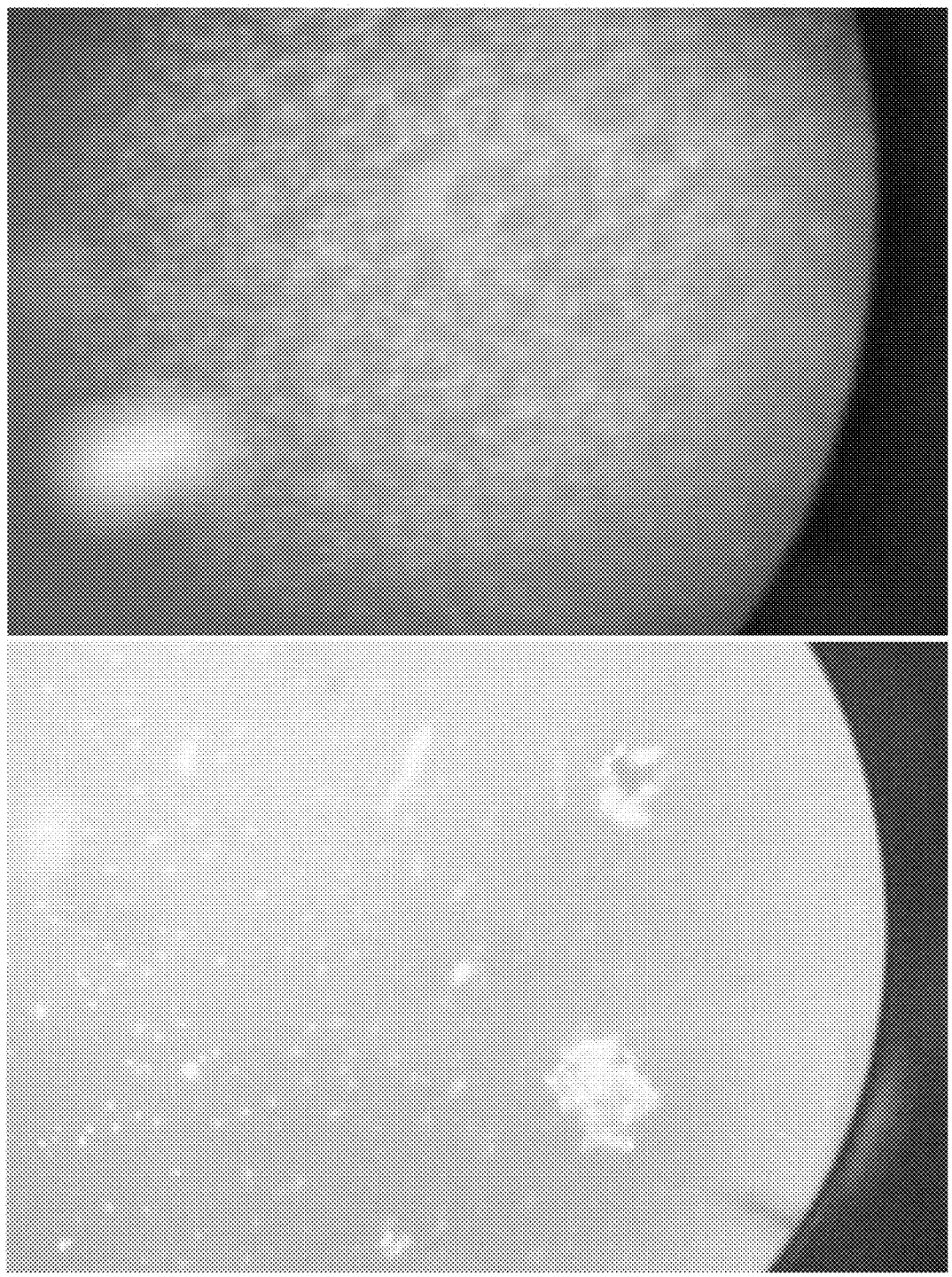
FIG. 7 depicts the results of microgravity reacted calcite (left) and unit gravity reacted calcite (right) viewed at 20× via optical microscopy.
Figure 8:
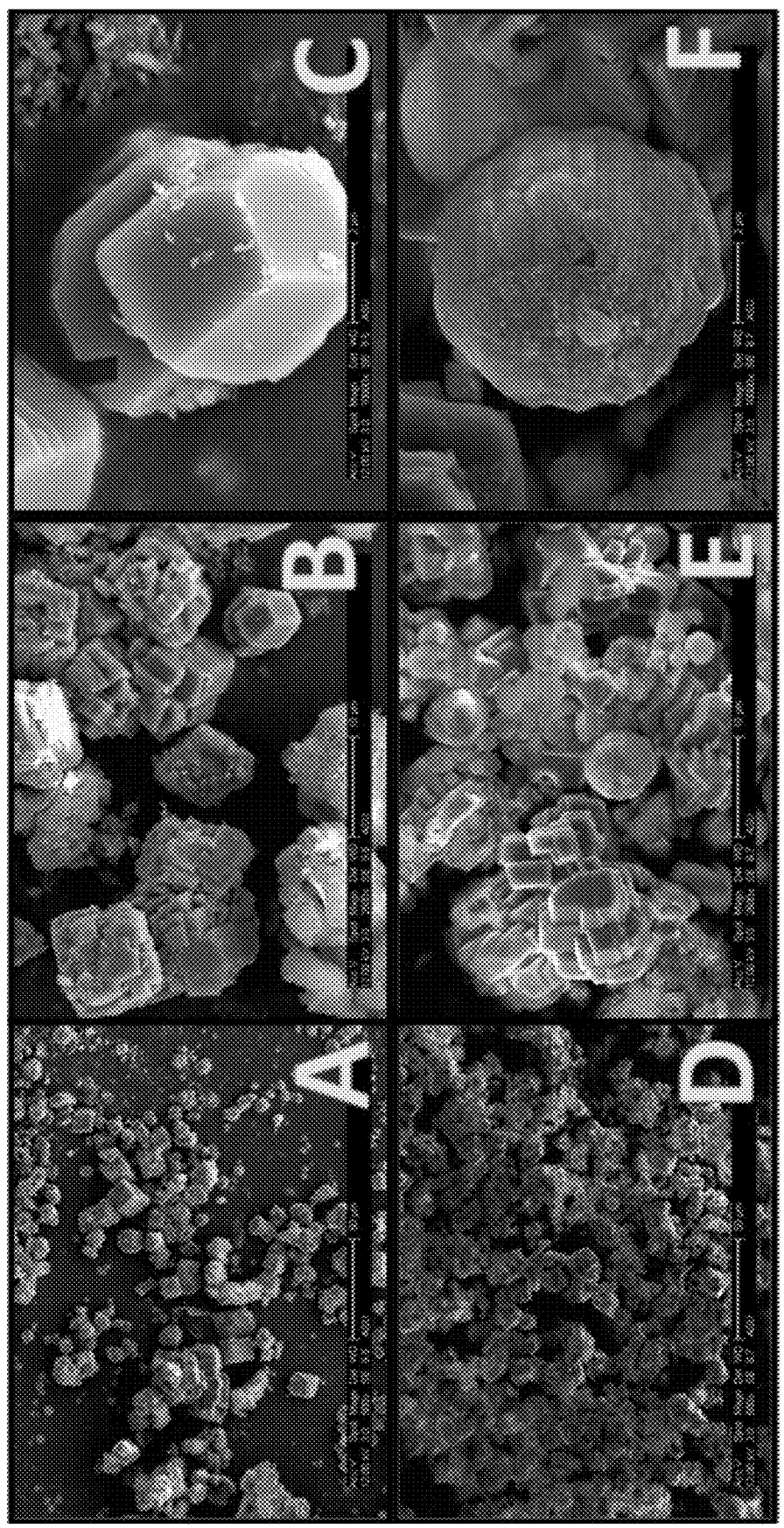
FIG. 8 depicts the results of SEM imaging of calcite development using a 100% saturated solution in unit gravity (A, B, C) and microgravity (D, E, F). A and D are at 200× magnification; B and E are at 2500× magnification; C and F are at 10000× magnification.

FIG. 7 shows microgravity build calcite on left, unit gravity on the right. This picture was taken from a microscope. Followed by XRD, SEM and DLS data. SEM images captured for more information on morphology of crystal FIG. 8 is SEM images of solution at saturation and develop calcite A, D is a calcite in 500× magnification, B, E is 2500× magnification, C and F are 10000× magnification. A, B, and C were developed in unit gravity while D, E, and F were made in simulated microgravity.

Figure 9:
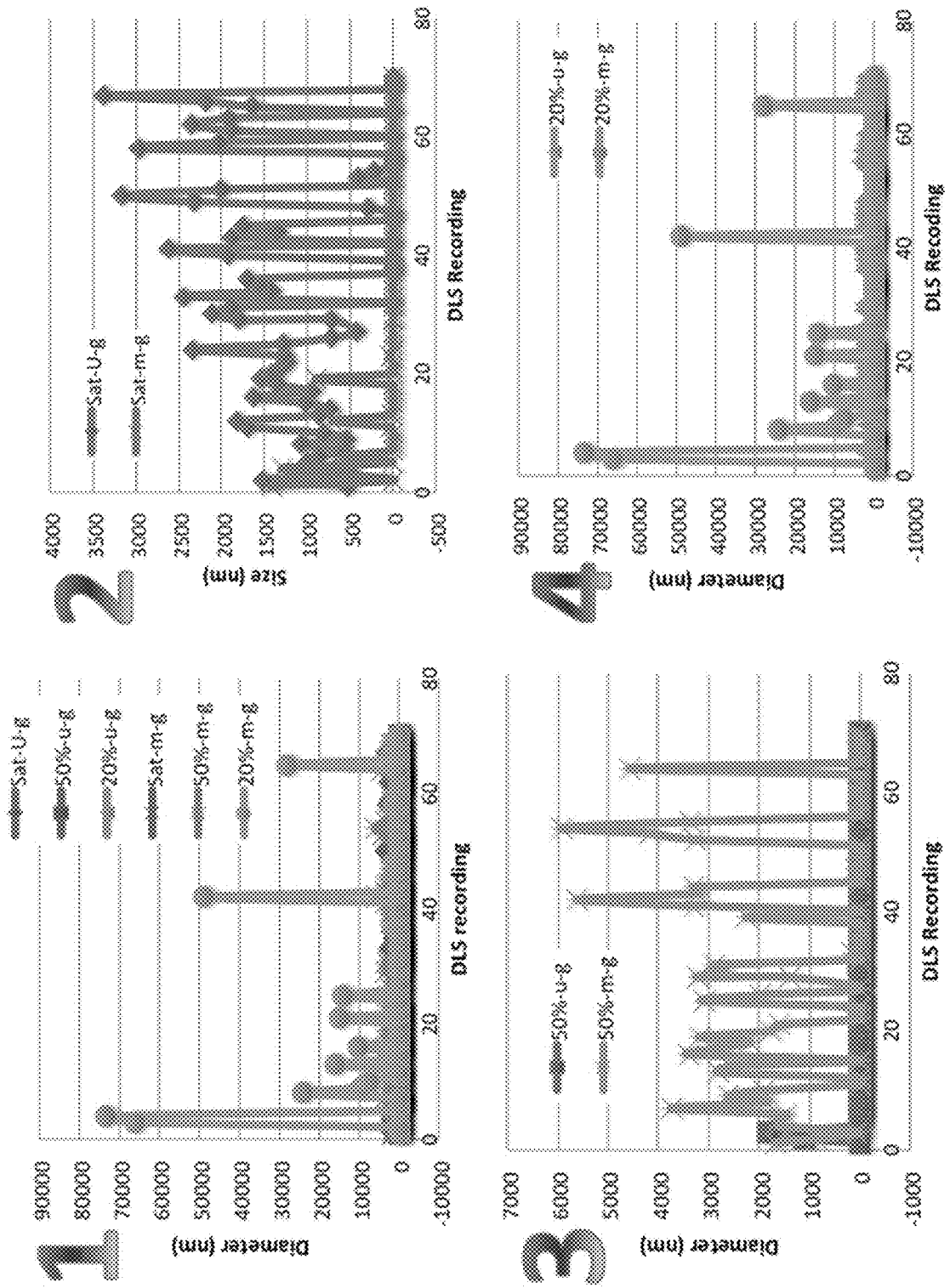
FIG. 9 depicts the results of dynamic light scattering (DLS) characterization of calcite developed in unit gravity and microgravity. Graph 1 combines all data. Graph 2 depicts only calcite developed using a 100% saturated solution. Graph 3 depicts only calcite developed using a 50% saturated solution. Graph 4 depicts only calcite developed using a 20% saturated solution.

DLS (dynamic light scattering) result for unit gravity and microgravity was conducted after completion of the experiment. FIG. 9 shows the results of those tests. The raw data collected from the observation of unit and microgravity (vertical conduit) are presented in Table 1.

tion increased. With a slight difference in density between Sol A and Sol B, it was decided to always mix Sol B with Sol A, where Sol B is higher in density.

TABLE 1

Raw data collected from observing unit gravity and microgravity calcite formation.

| Date | Test | Gravity | Velocity | Timepe Prep | Time First Saw | Total Time | Time Saw-Time Ice Melt | V = m/s |
|---|---|---|---|---|---|---|---|---|
| Jul. 6, 2013 | 50% | u-g | 0 | 38 | 101.7 | 900.5 | 1.07 | 0 |
| Jul. 6, 2013 | 50% | m-g | 4.2 L/min | 52 | 236.2 | 1296 | 136 | 0.034 |
| Jul. 6, 2013 | 20% | u-g | 0 | 30 | 130.8 | 388.5 | 50.8 | 0 |
| Jul. 6, 2013 | 20% | m-g | 2.16 L/min | 40.9 | 840 | 1200 | 740 | 0.0178 |
| Jul. 6, 2013 | 100% | u-g | 0 | 175.4 | 180.7 | 608.6 | 0.5 | 0 |
| Jul. 6, 2013 | 100% | m-g | 4.68 L/min | 28.3 | 161.3 | 600 | 5 | 0.0385 |
| Jul. 6, 2013 | 50% | u-g | 0 | 57 | 153.9 | 600 | 53.9 | 0 |
| Jul. 6, 2013 | 50% | m-g | 5.19 L/min | 183.6 | 312.1 | 609.6 | 84.5 | 0.0426 |
| Jul. 6, 2013 | 20% | u-g | 0 | 25 | 254.6 | 576 | 60 | 0 |
| Jul. 6, 2013 | 20% | m-g | 3.17 L/min | 66 | 839.3 | 1085 | 668.3 | 0.026 |
| Jul. 6, 2013 | 20% | m-g | 5.11 L/min | 25 | 723.3 | 1080 | 623.3 | 0.042 |

The overall goal of this research project was to assess the feasibility of investigating the effects of microgravity on mineralization systems in unit gravity environments. In order to achieve this, it was necessary to devise a prototypical experimental test system that could simulate microgravity conditions on the nucleation and growth of calcite mineral. The summary of the most pertinent results will be discussed in detail as exhibited in Table 2.

Figure 11:
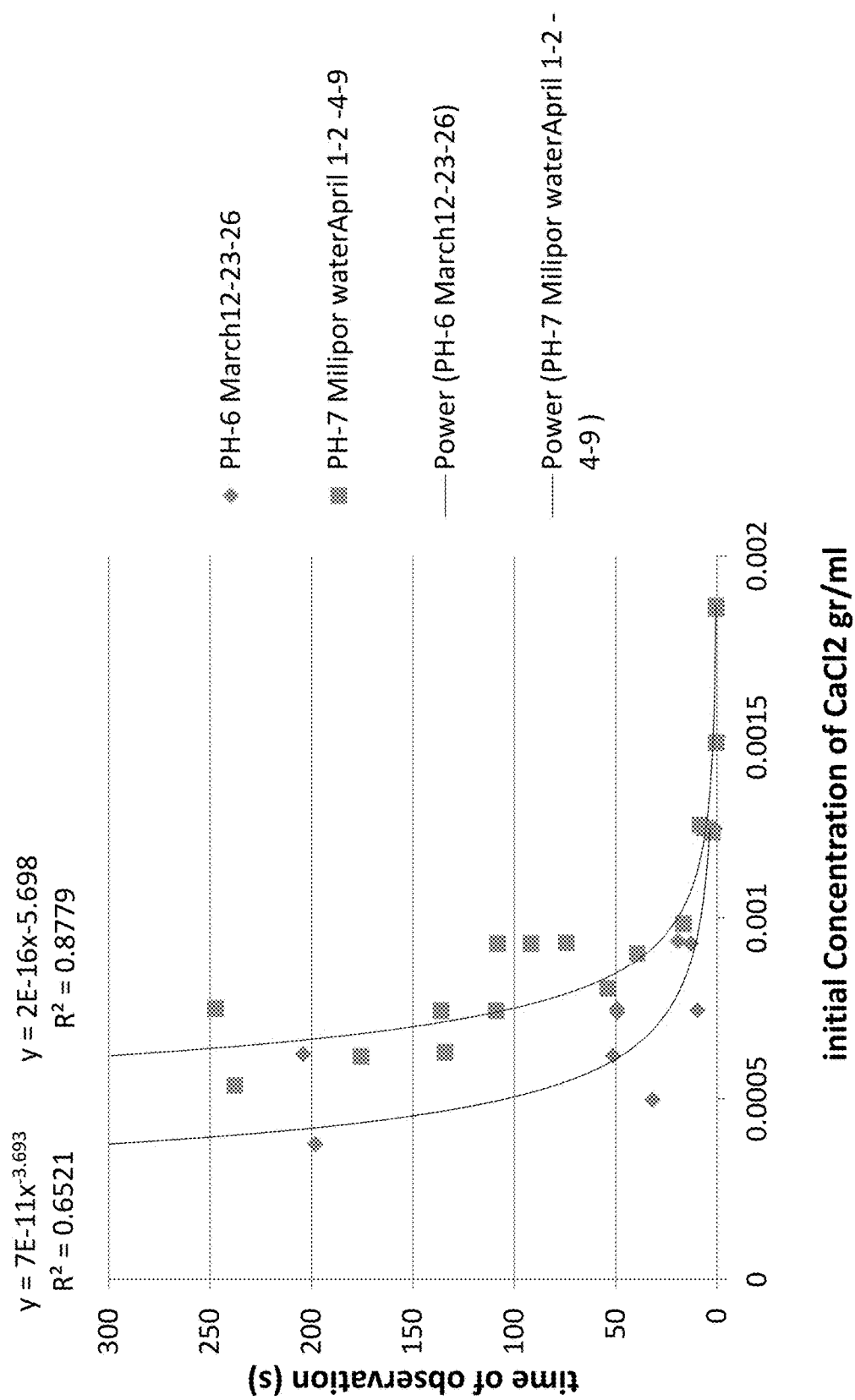
FIG. 11 depicts the results of experiments investigating the effect of pH on calcite formation.

During the initial testing, significant variation in the time of calcite formation was observed which was traced to the pH of DI water in the system. As shown in FIG. 11, even a one pH unit difference between the pH of DI water that Sol A and Sol B were made from can significantly alter the rate of calcite formation in the form of a delay in reaction.

The initial set of experiments was conducted in flat bottom glass test tubes. These glass test tubes were cleaned

TABLE 2

Results of experiments forming calcite in unit gravity and microgravity.

| | | Level of Saturation | | |
|---|---|---|---|---|
| | | 20% | 50% | 100% |
| DLS Particles | Unit-G | Small | Small | Large |
| | Micro-G | Large | Large | Small |
| V-terminal-(L/min) | Micro-G | 1.04 L/min | 2.76 L/min | 5.21 L/min |
| Theoretical Calculated | Micro-G | 2.16 L/min | 4.2 L/min | 4.68 L/min |
| | Micro-G | 3.12 L/min | 5.19 L/min | |
| Measured -Q- Flow | Micro-G | 5.11 L/min | | |
| SEM Philips X1-30 | Unit-G | Cubic | Cubic | Cubic |
| Microscopy | Micro-G | Irregular | Cubic + Spherical | Spherical |
| Time (s) of Formation | Unit-G | ~55 | ~53.9 | ~0.5 |
| of Calcite | Micro-G | ~690 | ~110 | ~5 |

Calcite Formation in Unit Gravity

Figure 10:
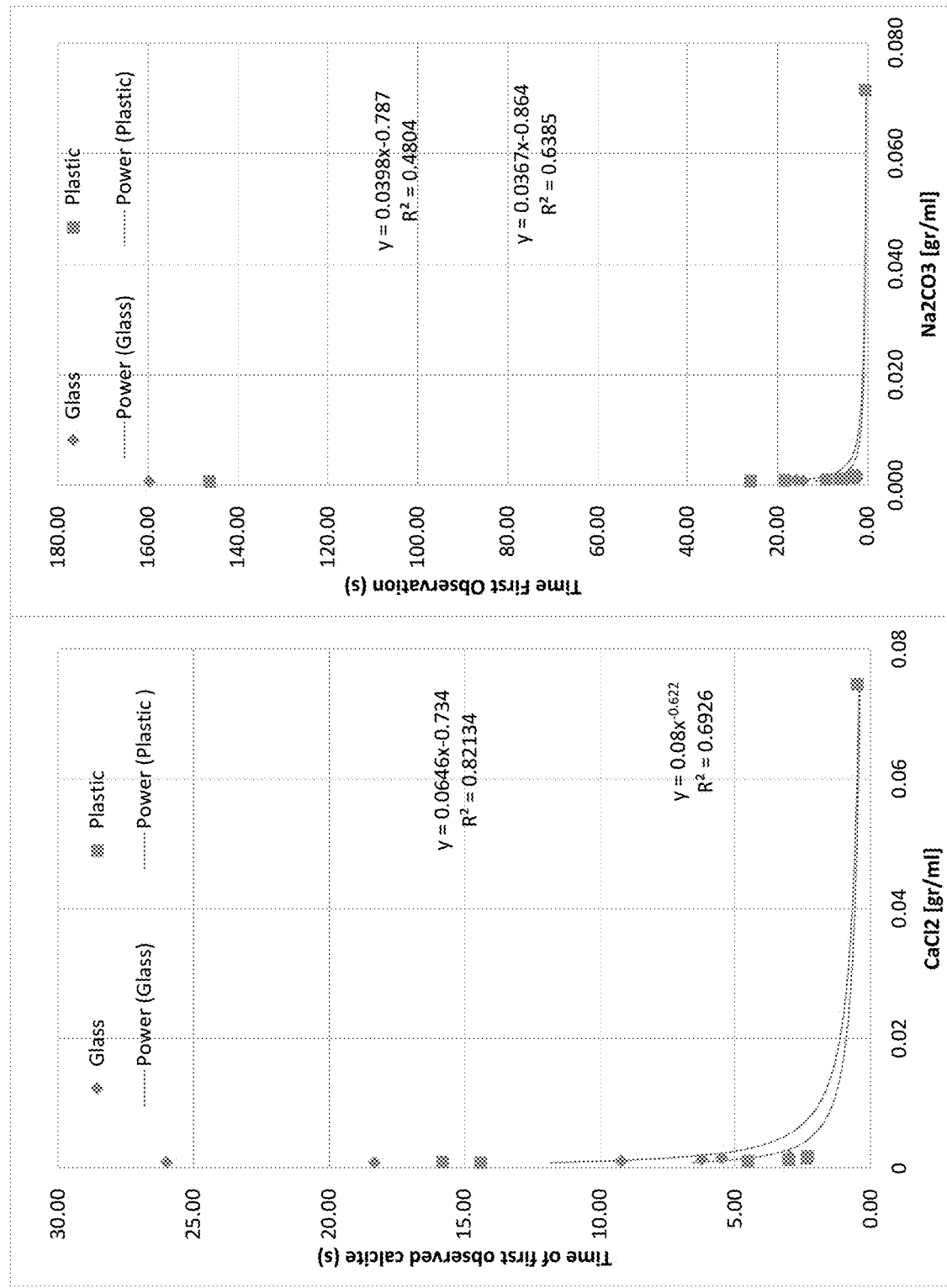
FIG. 10 depicts the results of experiments investigating the effect of substrate material on time of calcite formation. The top graph varies the concentration of $CaCl_2$, the bottom graph varies the concentration of $Na_2CO_3$.
Figure 12:
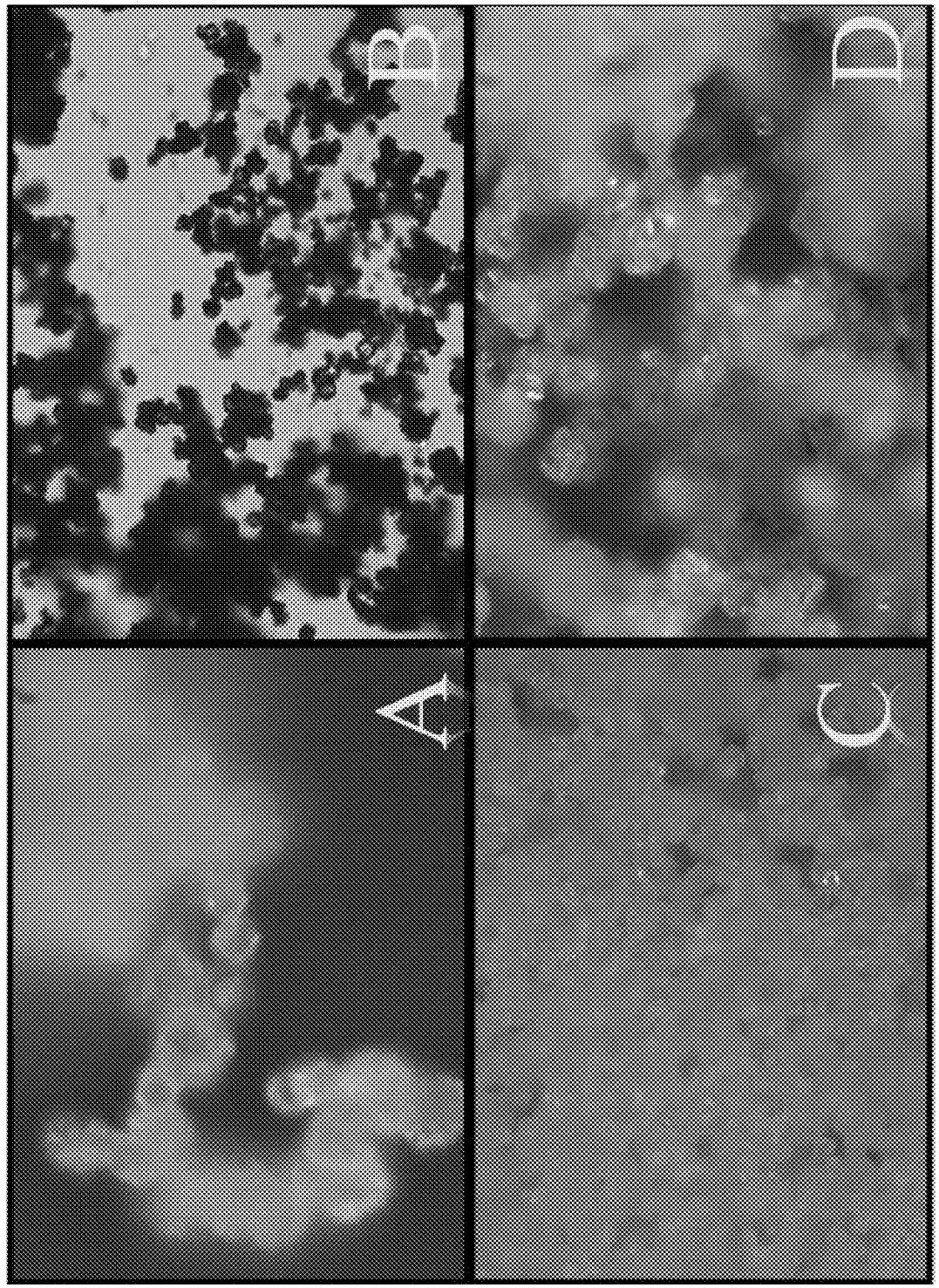
FIG. 12 depicts the results of experiments investigating the effects of temperature on calcite formation. Precursors for A (500×) and B (100×) were at room temperature, precursors for C (200×) and D (200×) were on ice. B and D are imaged under polarized light.

In the beginning of this project a series of experiments were conducted to investigate the effect of microgravity on the nucleation and growth of calcite. In this study, the direct visual observation of calcite formation was used whereby calcite particle formation above 35 µm was possible based upon a distinct change in solution color. The time that a color change was detected was typically long after incipient nucleation of the mineral. The nucleation and growth of calcite solutions over a wide range of saturation (20-100% saturation) was studied in this manner. Results obtained from direct observation of calcite mineralization are shown in FIG. 10. As evident in the figure, the data suggest a power law dependency on calcite precursor concentration. As shown in FIG. 10, as reactant concentration decreases, the time of first observing calcite formation increases. The site of calcite formation was observed to vary from the walls of the reaction chamber (heterogeneous nucleation) to the solution (homogeneous nucleation) as reactant concentravery carefully. These tests were repeated in plastic tubes as heterogeneous nucleation and growth process are affected by surface energetics. Although the results of these initial experiments shown in FIG. 12 do not show much of a difference between plastic and glass surfaces, images obtained from SEM in FIG. 13 do show different crystal morphology between glass and plastic surfaces. However, the calcite particle size distribution appeared to be the approximately the same between glass and plastic.

Figure 13:
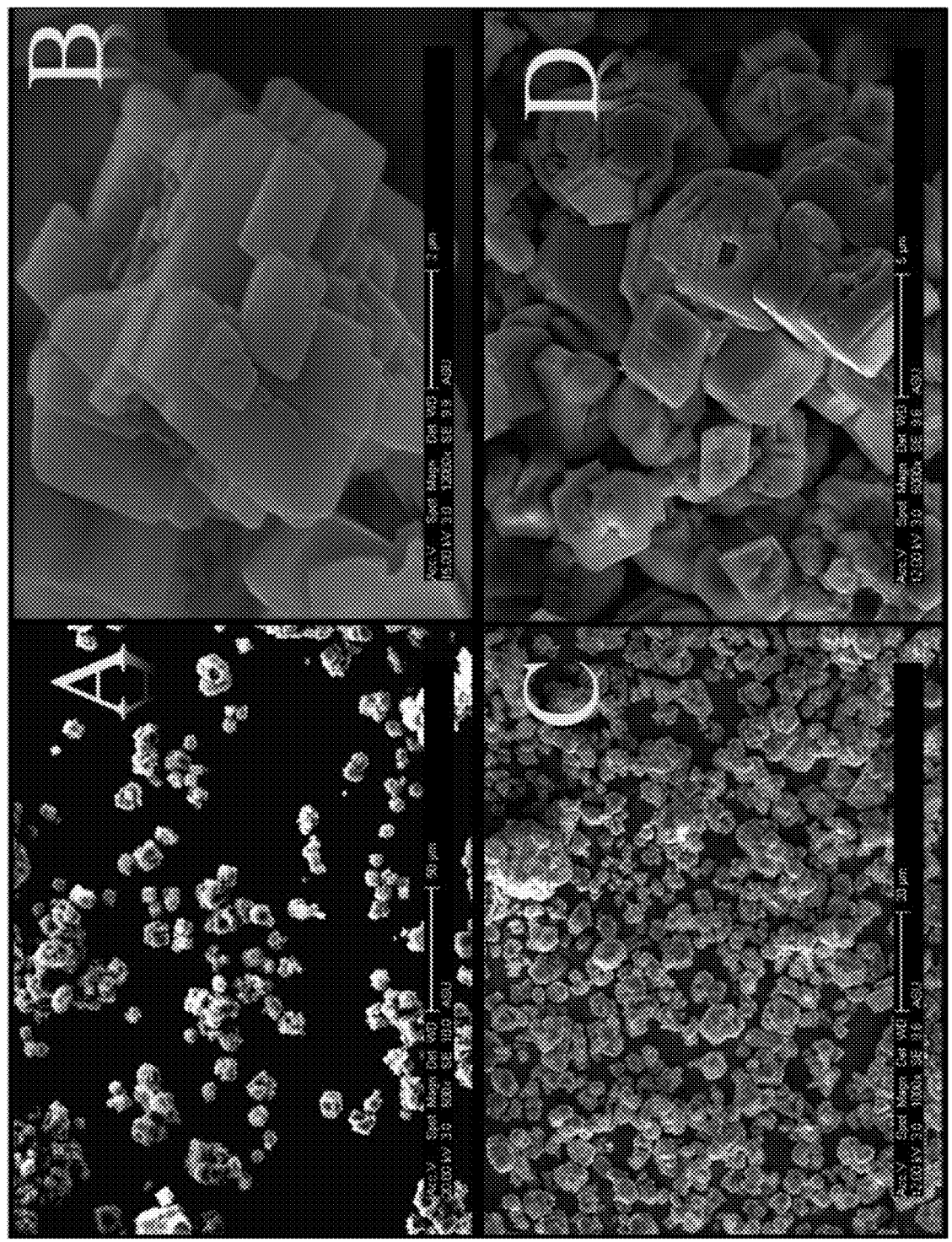
FIG. 13 depicts the results of SEM imaging of calcite grown on glass and plastic surfaces. A (500×) and B (12000×) are grown on glass. C (1000×) and D (5000×) are grown on plastic.

Another factor that was tested for this series of experiments was the difference in the temperature of the reactant solutions used for calcite mineralization. The stock solution temperatures of 0° Celsius and 25° Celsius (room temperature) were used in these experiments. The calcite samples obtained were imaged with SEM and the results obtained are shown in FIG. 13. As can be seen, the calcite crystals appear similar in morphology and the only difference is seen in the particle size distribution. Also, 0° C. calcite precursor solution appeared to produce more crystals than the solution kept at room temperature. The results of dynamic light scattering tests performed for all calcite precursor concentrations studied are summarized in FIG. 14 and FIG. 15. DLS data indicates that the time of nucleation and growth (time of first appearance in the system) increases as the precursor concentration decreases. Alizarin Red staining tests gave preliminary indication of the existence of calcium in the system. XRD characterization was used to confirm calcite formation as discussed later in this section.

Reactor Housing Design

Figure 16:
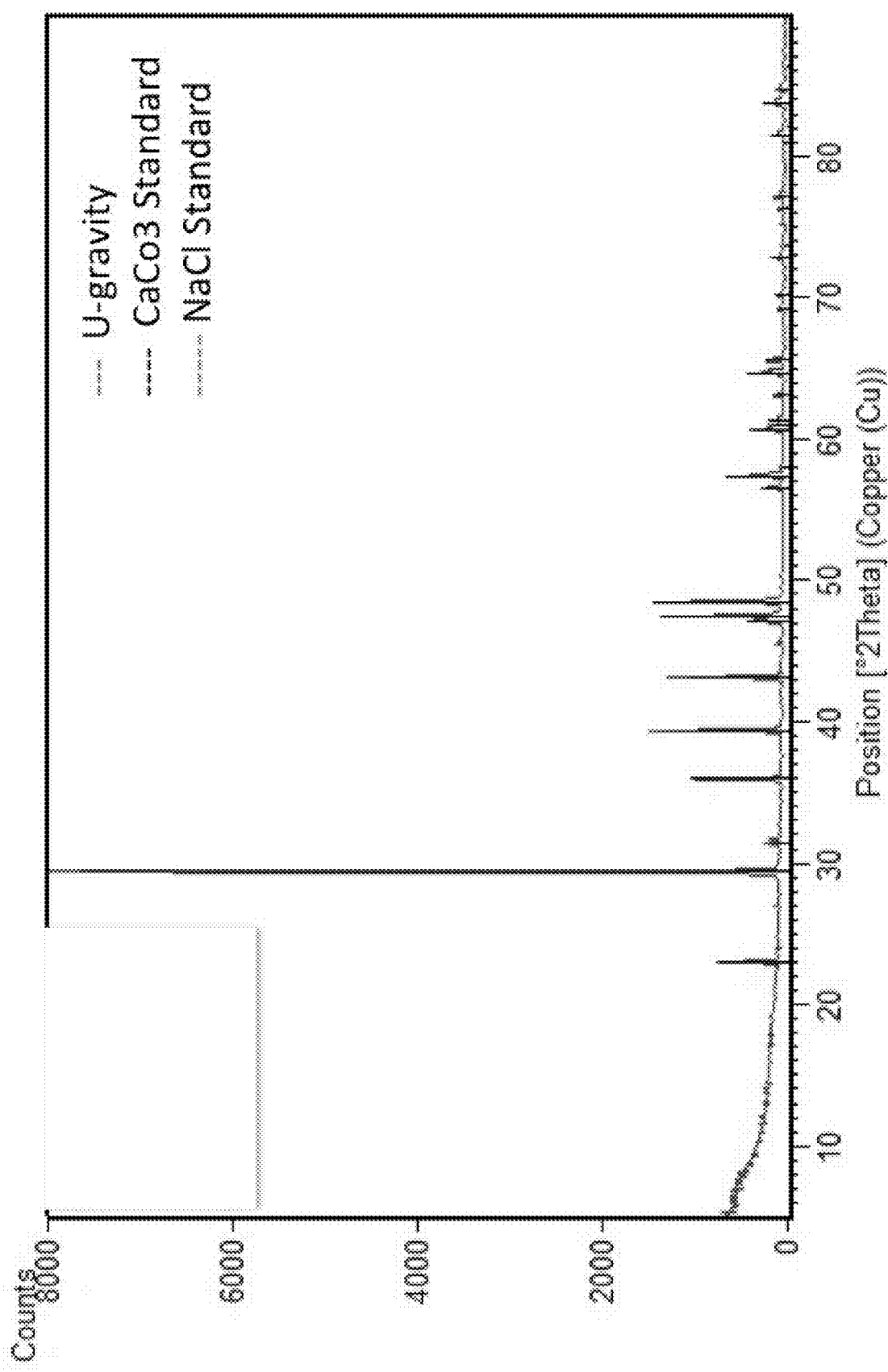
FIG. 16 depicts the results of x-ray diffraction (XRD) of calcite and standard $CaCO_3$ and NaCl at unit gravity.

A series of alternative reactor housing design concepts were developed for materials synthesis purposes; here, materials synthesis related to studying calcite mineralization under microgravity test conditions in a unit gravity test environment. A key goal of this part of the study was to develop a reactor housing which could maintain isolation of the reactants until test conditions were established. The reactor housing was chosen to be spherical for enhanced flow stability and where each half of the sphere had two access holes; one to inject the solution (Sol A or Sol B) and the other to displace air. The reactor midsection was sealed using a plastic insert having a transport tube that was initially blocked with ice to allow Sol A and Sol B to mix only after unit and microgravity conditions were established and prior to calcite precursors reacting. In this design, there was an approximate 98 second delay between the time that the spherical reactor was set up with isolated Sol A and Sol B reactant solutions and the time it was placed in simulated microgravity. Ice was chosen, as there was a need for a degradable material to isolate the reactants without interfering with the reaction. A series of various degradable designs were studied but most presented complications primarily with incipient nucleation. In the final design, the core of the system is a glass tube with ice in the shape of a dumbbell as shown in FIG. 16. Based on this design, the volume of ice required to keep the channel closed up to 180 (s) is about 0.8 mL. Another design criteria for this study was the terminal velocity adjustment with respect to the particle size and frequency.

Simulated Microgravity Systems and Result

A vertical flow conduit was designed that could attain terminal velocity conditions for calcite mineralization. Experimental microgravity simulations using this system were performed and samples collected were subsequently analyzed. Three calcite saturations conditions were selected: 20%, 50% and 100% saturation.

Figure 17:
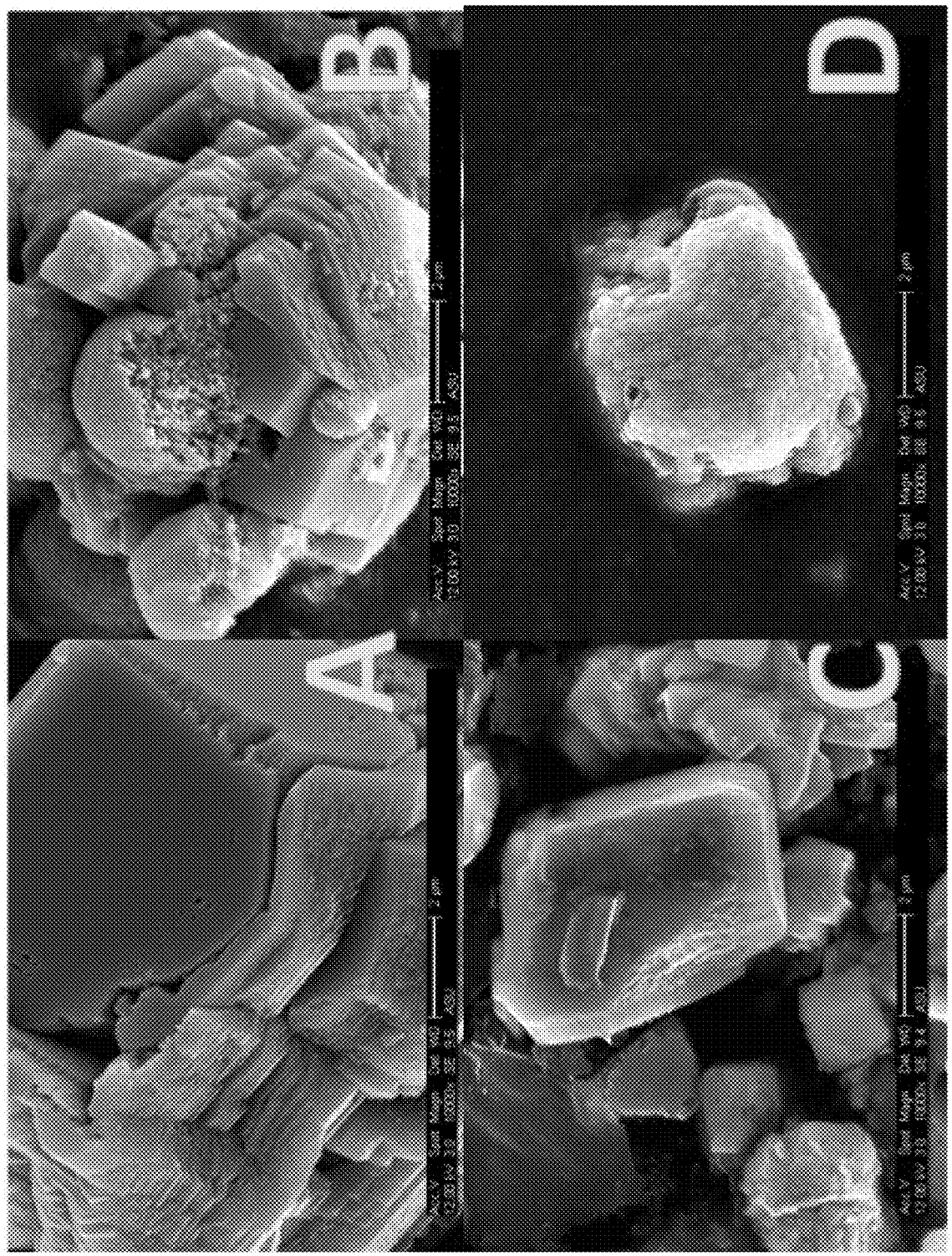
FIG. 17 depicts the results of SEM imaging of calcite formed under varying conditions. A is calcite developed in unit gravity using a 50% saturated solution imaged at 10000×. B is calcite developed in microgravity using a 50% saturated solution imaged at 10000×. C is calcite developed in unit gravity using a 20% saturated solution imaged at 10000×. D is calcite developed in microgravity using a 20% saturated solution imaged at 10000×.

Optical and scanning electron microscopy was performed on the samples. Results obtained from optical microscopy are presented in FIG. 8 whereby changes in particle number and shape can be seen between unit-G and micro-G conditions. Further, SEM results revealed distinct morphological differences in particles (FIG. 17). More specifically, the saturated unit-G sample displayed a more defined, geometrical shape (cubic form) while the micro-G sample displayed a more spherical shape. The results of XRD result indicated the existence of an organic material that was not calcite in micro gravity sample but was not present in the unit gravity sample (FIG. 9); contamination may be the reason for this observation. In FIG. 9, for 50% saturated test conditions in unit gravity, the crystals are mostly in cubic form, but in micro-G there is a change between cubic and spherical which was similar to what was seen in the 100% saturated micro-G test results. Sections C and D represent cubic geometry for unit-G and a very irregular geometry for micro-G sample.

Results obtained from DLS run after unit and micro-G experiments were concluded (FIG. 18), indicating that the saturated solution provided larger diameter calcite particles in unit-G than the micro-G. The results of 50% saturation, simulated micro-G resulted in more particles produced than in unit-G and the results of 20% saturation there is a similar trend.

Figure 14:
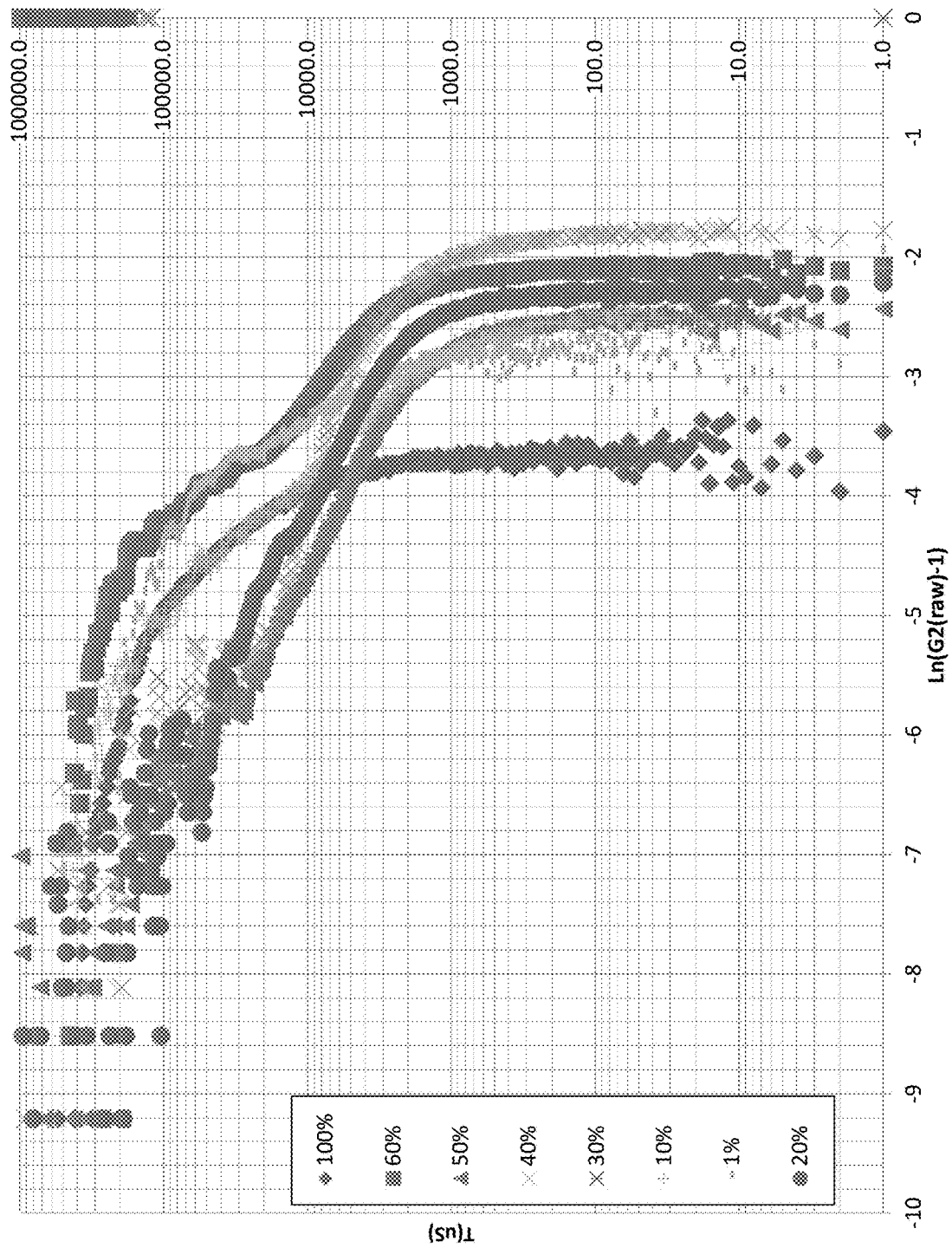
FIG. 14 depicts the results of dynamic light scattering (DLS) characterization of calcite formed using varying precursor concentrations.
Figure 15:
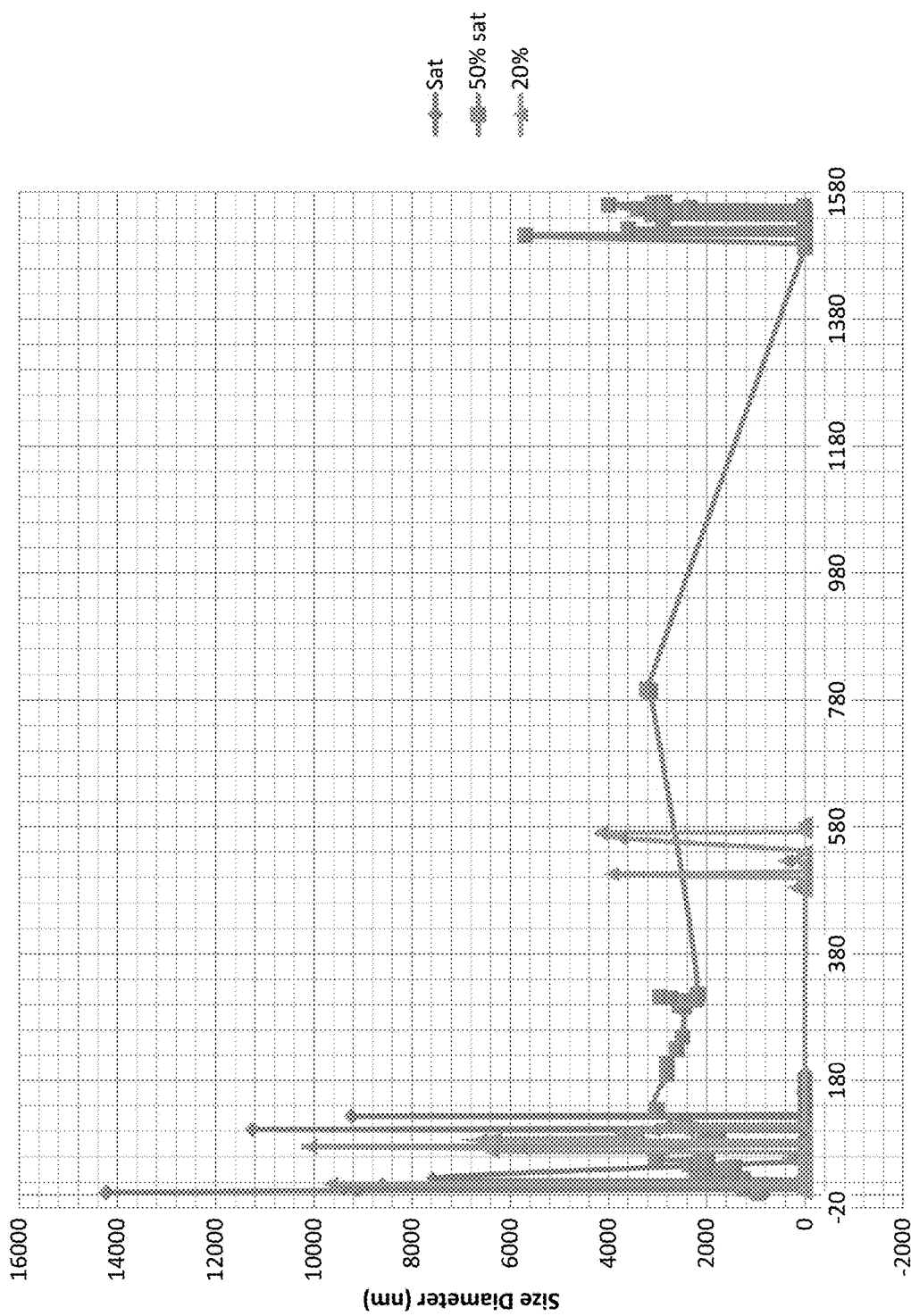
FIG. 15 depicts the results of dynamic recording of time and particle formation in solution at unit gravity.

Results obtained from direct visual observation provided in FIG. 14 in all cases indicated a significant time delay for calcite mineralization between unit-G and micro G. The terminal velocity calculated was based on the presumption that equal and opposite forces should nullify the gravitational force, in this case achieved by water flowing in the opposite direction at a flow rate to maintain the spherical reactor at a constant height, suspended in the mid-section of the vertical pipe to simulate microgravity conditions. Results obtained from these experiments (highlighted in FIG. 15), indicated that the terminal velocity for saturation conditions was ~11% below the theoretical value at simulated microgravity conditions. Recognizing various sources of experimental error, (e.g., parafilm used for closing system +/−0.02 gr and the syringe used to move chemical has a +/−0.1 mL error as well as the chance of developing air bubbles in the system that can directly affect average density of the reactor housing), the results shown in FIG. 18 do not appear to be artifact.

Figure 18:
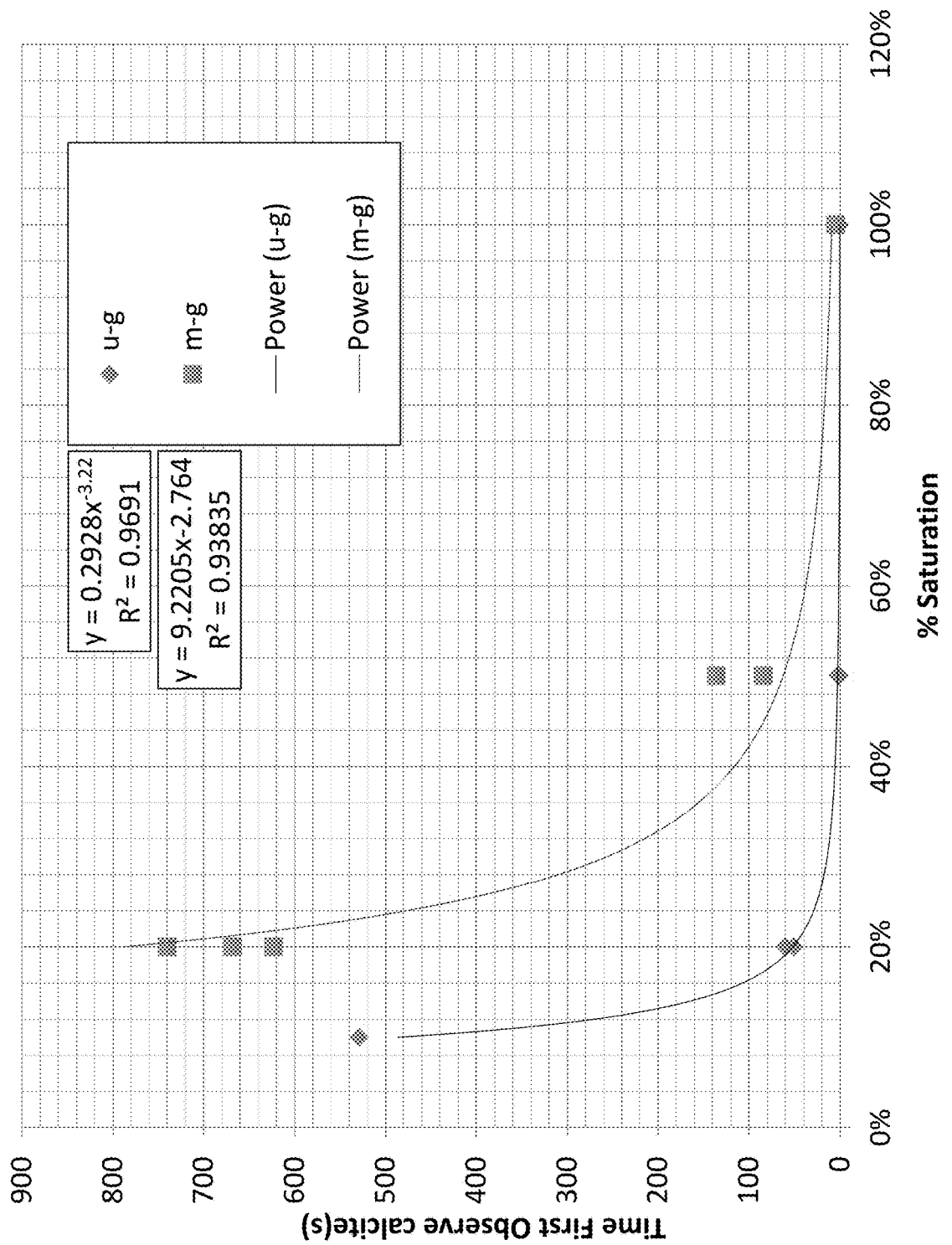
FIG. 18 depicts the results of DLS observations on calcite formed under varying saturation levels.
Figure 19:
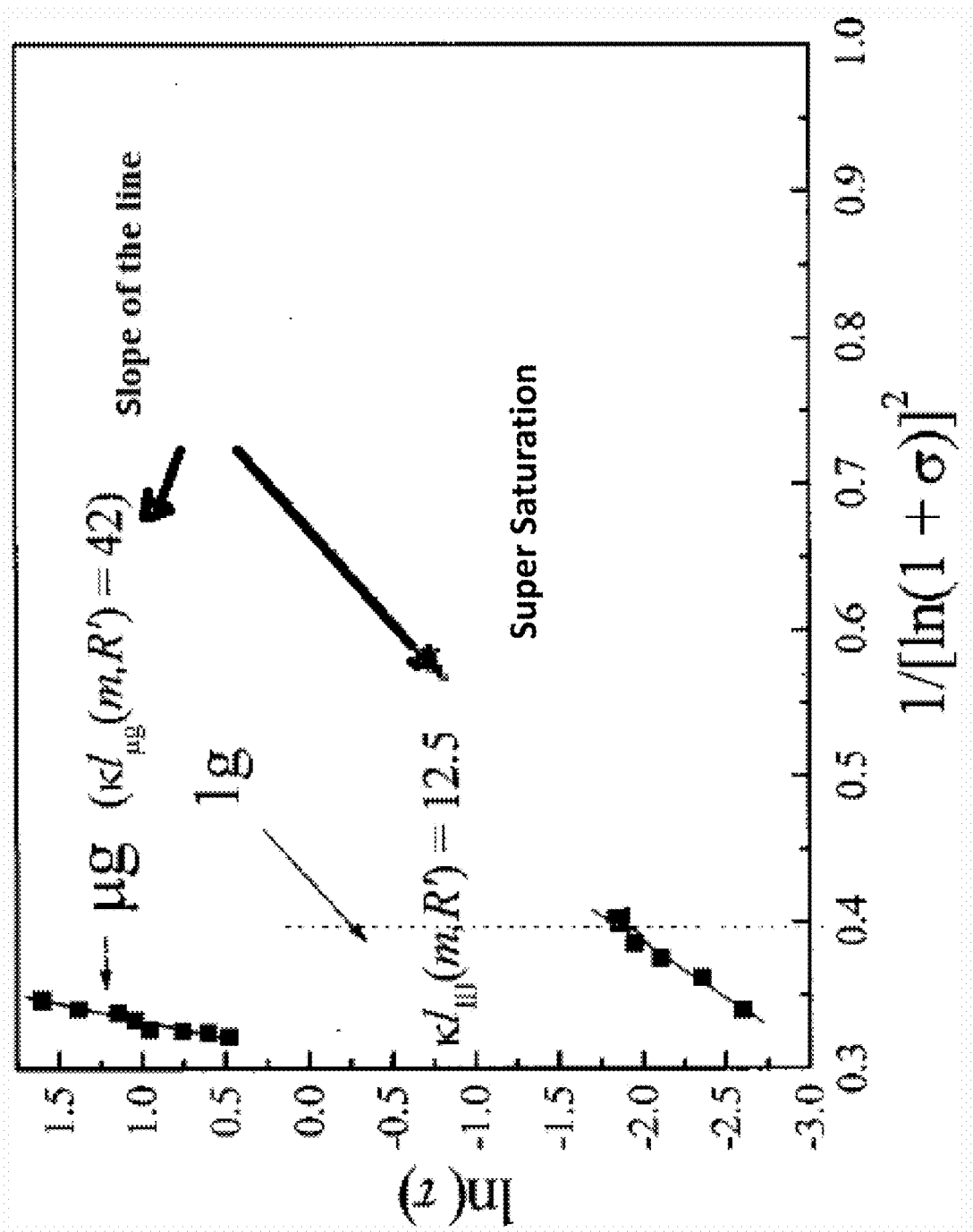
FIG. 19 depicts the results of calcite formation reacted on a reduced gravity aircraft.

As previously mentioned, the goal was to develop a microgravity system and verify the results against prior data as reproduced in FIG. 19. This figure indicates that the parameter $\tau$ is the time of nucleation collected via fast DLS vs. $1/\ln(1+\sigma)^2$, where $\sigma$ is the degree of saturation. In this figure, it indicates that the slope of the line in microgravity is four times larger than the slope of the line in unit gravity. For the results obtained from the vertical conduit system reported herein, the results are consistent (see FIG. 14) and (SEM and Optical) microscopy results. In the data presented in FIG. 15 and FIG. 18, it was not possible to perform DLS in situ; hence there was a time difference between the time of microgravity runs and the time that DLS data was recorded. XRD results indicated differences between microgravity and unit gravity may affect nucleation and growth process. Finally, as shown in FIG. 18, there was a significant time delay observed between unit gravity and microgravity for results obtained for the first time at unit G conditions. These results are consistent with results shown in FIG. 19 obtained from above ground, parabolic flight systems.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A system, comprising:
   at least one conduit having at least one lumen in communication with an inlet and an outlet, the inlet positioned at a height below a height of the outlet;
   a fluid medium flowable through the at least one conduit by a fluid flow inducer; and
   a bounded chamber comprising an outer enclosure surrounding a partitioned, multi-compartment interior, sized to freely move within the at least one lumen of the at least one conduit.

2. The system of claim 1, wherein the at least one conduit is sized to accommodate the bounded chamber between the inlet and the outlet.

3. The system of claim 1, wherein the at least one conduit has an axial length scale greater than an axial length of the bounded chamber.

4. The system of claim 1, wherein the at least one conduit has a width or a radius such that the at least one conduit comprises an aspect ratio between an axial length and the width or radius sized to accommodate the bounded chamber between the inlet and the outlet.

5. The system of claim 1, wherein the fluid medium is selected from water, oils, gels, air, nitrogen, inert gases, single phase fluids, multiphase fluids, and combinations thereof.

6. The system of claim 1, wherein the partitioned, multi-compartment interior is partitioned into two compartments by a barrier element comprising a ring sized to sealingly fit within the interior, a hollow core sized to sealingly fit within a central hole of the ring, and a plug sized to sealingly fit within the hollow of the core.

7. The system of claim 6, wherein the plug is a gate or valve that is openable to unblock the hollow of the core and fluidly connect the two compartments.

8. The system of claim 6, wherein the plug comprises a dissolvable or degradable material that melts or breaks apart over time to unblock the hollow of the core and fluidly connect the two compartments.

9. The system of claim 1, wherein regions of the outer enclosure of the bounded chamber comprise a semipermeable membrane.

10. The system of claim 1, wherein the outer enclosure of the bounded chamber comprises a volume of a fluid that is immiscible with the fluid medium flowable through the at least one conduit.

11. A method of suspending a chamber in a fluid, comprising the steps of:

providing the system of claim 1;

aligning the at least one conduit at an angle relative to a plane normal to a gravitational pull, the angle being between about 1° and 179°; and flowing the fluid medium into the inlet of the at least one conduit and out of the outlet of the at least one conduit, wherein the fluid medium has a density that is less than a density of the bounded chamber, and wherein the fluid medium is flowed at a flow rate that supports the bounded chamber such that the bounded chamber is maintained at a constant position within the at least one conduit.

12. A bounded chamber device, comprising:

an outer enclosure surrounding a partitioned, multi-compartment interior partitioned into two compartments by a barrier element comprising a ring sized to sealingly fit within the interior, a hollow core sized to sealingly fit within a central hole of the ring, and a plug sized to sealingly fit within the hollow of the core.

13. The device of claim 12, wherein the plug is a gate or valve that is openable to unblock the hollow of the core and fluidly connect the two compartments.

14. The device of claim 12, wherein regions of the outer enclosure of the bounded chamber comprise a semipermeable membrane.

* * * * *